US012654722B2

(12) United States Patent

Ucar et al.

(10) Patent No.: US 12,654,722 B2

(45) Date of Patent: Jun. 16, 2026

(54) SYSTEM AND METHOD FOR SELECTING A VEHICLE SENSING MECHANISM ACCORDING TO DRIVING CONDITIONS

(71) Applicant: TOYOTA MOTOR ENGINEERING & MANUFACTURING NORTH AMERICA, INC., Plano, TX (US)

(72) Inventors: Seyhan Ucar, Mountain View, CA (US); Emrah Akin Sisbot, Mountain View, CA (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 97 days.

(21) Appl. No.: 18/613,038

(22) Filed: Mar. 21, 2024

(65) Prior Publication Data

US 2025/0296581 A1 Sep. 25, 2025

(51) Int. Cl.
*B60W 50/029* (2012.01)
*B60W 60/00* (2020.01)

(52) U.S. Cl.
CPC ...... *B60W 50/029* (2013.01); *B60W 60/0015* (2020.02); *B60W 2420/403* (2013.01);
(Continued)

(58) Field of Classification Search
CPC ...... B60W 30/08; B60W 30/09; B60W 40/02; B60W 40/09; B60W 50/0098;
(Continued)

(56) References Cited

U.S. PATENT DOCUMENTS

| | | |
|---|---|---|
| 10,318,828 B2 | 6/2019 | Hampiholi |
| 10,540,892 B1 | 1/2020 | Fields |

(Continued)

FOREIGN PATENT DOCUMENTS

| | | |
|---|---|---|
| CN | 110020797 | 7/2019 |

OTHER PUBLICATIONS

Laine et al., "Eyes-Closed Safety Kernels: Safety of Autonomous Systems Under Loss of Observability," Robotics: Science and Systems 2020, Jul. 16, 2020, 9 pages (https://roboticsconference.org/2020/program/papers/96.html).

(Continued)

*Primary Examiner* — Brandon Z Willis
(74) *Attorney, Agent, or Firm* — SHEPPARD, MULLIN, RICHTER & HAMPTON LLP; Daniel N. Yannuzzi

(57) ABSTRACT

A method and system are provided for implementing vehicle sensing mechanism selection which address the problems and limitations experienced by many conventional unsafe driver detection systems. The disclosed vehicle sensing mechanism selection system is designed to intelligently determine which sensing mechanisms of a vehicle is optimal for unsafe driver detection based on the driving conditions, such as the driving characteristics of a subject vehicle. Additionally, the vehicle sensing mechanism selection system has the capability to dynamically change the vehicle's operation in real-time to the selected sensing mechanism deemed optimal for the current situation (e.g., detected driving conditions, detected driving characteristics of a subject vehicle). The vehicle sensing mechanism selection system mitigates interruptions while observing a subject vehicle, which improves accuracy of the vehicle's unsafe driver detection. The vehicle sensing mechanism selection system and its distinct functions can enhance vehicle safety features.

20 Claims, 8 Drawing Sheets

(52) U.S. Cl.
CPC .................. *B60W 2420/408* (2024.01); *B60W 2554/4046* (2020.02); *B60W 2556/45* (2020.02)

(58) Field of Classification Search
CPC ............. B60W 50/02; B60W 50/0205; B60W 50/029; B60W 2050/0215; B60W 60/0011; B60W 60/0015; B60W 60/0016; B60W 2420/403; B60W 2420/408; B60W 2540/30; B60W 2554/4046; B60W 2555/20; B60W 2556/45; B60W 2556/65; G06V 20/52; G06V 20/54; G06V 20/56; G06V 20/58; G06V 2201/08; G08G 1/017; G08G 1/0175; G08G 1/16; G08G 1/166; G05D 1/606; G05D 1/617; G05D 1/619; G05D 1/621; G05D 1/622; G05D 1/633; G05D 1/85; G05D 1/857
See application file for complete search history.

(56) References Cited

U.S. PATENT DOCUMENTS

| | | | |
|---|---|---|---|
| 11,414,088 B2 | 8/2022 | Ucar | |
| 11,597,395 B2 | 3/2023 | Ucar | |
| 2014/0336892 A1* | 11/2014 | Braunberger | B60W 50/14 701/70 |
| 2015/0061895 A1* | 3/2015 | Ricci | G06V 40/28 340/902 |
| 2017/0291546 A1* | 10/2017 | Lai | B60Q 9/008 |
| 2018/0257647 A1* | 9/2018 | Jurca | G01S 13/931 |
| 2019/0300007 A1* | 10/2019 | Hilligardt | B60W 50/029 |
| 2021/0129868 A1* | 5/2021 | Nehmadi | B60W 60/001 |
| 2022/0126863 A1 | 4/2022 | Moustafa | |
| 2022/0126864 A1* | 4/2022 | Moustafa | B60W 40/09 |
| 2022/0363267 A1 | 11/2022 | Kristinsson | |
| 2023/0029925 A1 | 2/2023 | Choi | |
| 2023/0230421 A1 | 7/2023 | Ucar | |
| 2025/0225874 A1* | 7/2025 | Yang | G08G 1/096791 |

OTHER PUBLICATIONS

Singh, "Critical Reasons for Crashes Investigated in the National Motor Vehicle Crash Causation Survey," Traffic Safety Facts Crash•tats, Report No. DOT HS 812 506, Mar. 2018, National Highway Traffic Safety Administration (https://crashstats.nhtsa.dot.gov/Api/Public/Publication/812506).
"Distracted Driving in America: A Public Safety Crisis," Selective Insurance Group, Inc., 1 page (https://www.selective.com/~/media/Files/S/Selective-V2/documents/pdf-links/Distracted-Driving-Infographic.pdf).
"Global Status Report on Road Safety 2018." World Health Organization (WHO), Management of Noncommunicable Diseases, Disability, Violence and Injury Prevention (NVI), Jun. 17, 2018, 424 pages https://www.who.int/publications/i/item/9789241565684.
Madrid et al., "Matrix Profile XX: Finding and Visualizing Time Series Motifs of All Lengths using the Matrix Profile," 2019 IEEE International Conference on Big Knowledge (ICBK), Nov. 2019, pp. 175-182 (https://doi.org/10.1109/ICBK.2019.00031).
Mercer et al., "Introducing the Contrast Profile: A Novel Time Series Primitive that Allows Real World Classification," Data Mining and Knowledge Discovery (DMKD 2022), 36:877-915, Mar. 17, 2022 (https://doi.org/10.1007/s10618-022-00824-5).

* cited by examiner

600

PROCESSOR 604

MEMORY
608

STORAGE DEVICES
610

MEDIA DRIVE
612

MEDIA
614

STORAGE
UNIT I/F
620

STORAGE
UNIT
622

BUS
602

COMM I/F 624

CHANNEL 628

SYSTEM AND METHOD FOR SELECTING A VEHICLE SENSING MECHANISM ACCORDING TO DRIVING CONDITIONS

TECHNICAL FIELD

The present disclosure generally relates to vehicle communication and vehicle navigation and/or computer-controlled driving technology. In particular, data identifying various driving conditions, such as characteristics associated with a subject vehicle, can be analyzed in order to employ a sensing mechanism that is deemed most optimal for supporting computer-controlled vehicle capabilities, such as collision avoidance and unsafe driver detection.

DESCRIPTION OF RELATED ART

Vehicle accidents (e.g., collisions) are a constant threat to drivers, passengers, pedestrians and property. Accidents, which unfortunately result in injury, in some instances, may be caused by the driver. Unsafe driving is behavior exhibited by the driver of a vehicle that involves maneuvering the vehicle in a manner that is extremely unsafe for the current conditions of the vehicle, road, or surroundings which abuses and/or jeopardizes the safety of others. For instance, "driver caused" accidents may be attributed to different types of unsafe driving behavior, including: aggressive driving (e.g., tailgating, cut-in lane, etc.); distracted driving (e.g., swerving, delayed reaction, etc.); and reckless driving (e.g., running red lights, no-signal lane changes, etc.).

Unsafe drivers are a problem that is pervasive on roadways and can lead to severe human injury and/or property damage. According to the National Highway Traffic Safety Administrations (NHTSA), there were over 7.2 million reported car accidents in 2016—many of which were avoidable. The NHTSA has also compiled data which suggests that: 55% of all accidents include at least one aggressive driver; 87% of U.S. drivers have engaged in distracted driving; and rear-end collisions are the most frequent type of collision in the United States (and most of them due to distracted/reckless driving behavior of follower vehicles). Consequently, as a preventative measure, some vehicles currently on the market are equipped with systems and capabilities to enable hazardous conditions to be automatically recognized, such as detecting when a rear vehicle is closely approaching (e.g., rear vehicle approaching indication).

BRIEF SUMMARY OF THE DISCLOSURE

In accordance with embodiments of the disclosed technology, a system may comprise a processor device that analyzes data associated with driving characteristics of a first vehicle and selecting for a second vehicle one or more vehicle sensing mechanisms that are optimal for observing the first vehicle. The processor device can select the vehicle sensing mechanism based on analyzing the data associated with driving characteristics of the first vehicle. The system can also include a controller device that executes autonomous actions to maneuver the second vehicle in response to detecting that the first vehicle is exhibiting unsafe diver behavior. The controller device can detect that the first vehicle is exhibiting unsafe diver behavior based on data associated with the movement of the first vehicle that is obtained using the selected one or more vehicle sensing mechanisms.

In accordance with embodiments of the disclosed technology, a non-transitory computer readable medium may comprise instructions that implement analyzing data associated with driving characteristics of a first vehicle and selecting for an second vehicle one or more vehicle sensing mechanisms that are optimal for observing the first vehicle. Selecting can be based on analyzing the data associated with driving characteristics of the first vehicle. The non-transitory computer readable medium may comprise further instructions that implement executing autonomous actions to maneuver the second vehicle in response to detecting that the first vehicle is exhibiting unsafe diver behavior. Detecting that the first vehicle is exhibiting unsafe diver behavior is based on data associated with the movement of the first vehicle obtained using the selected one or more vehicle sensing mechanisms.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1A:
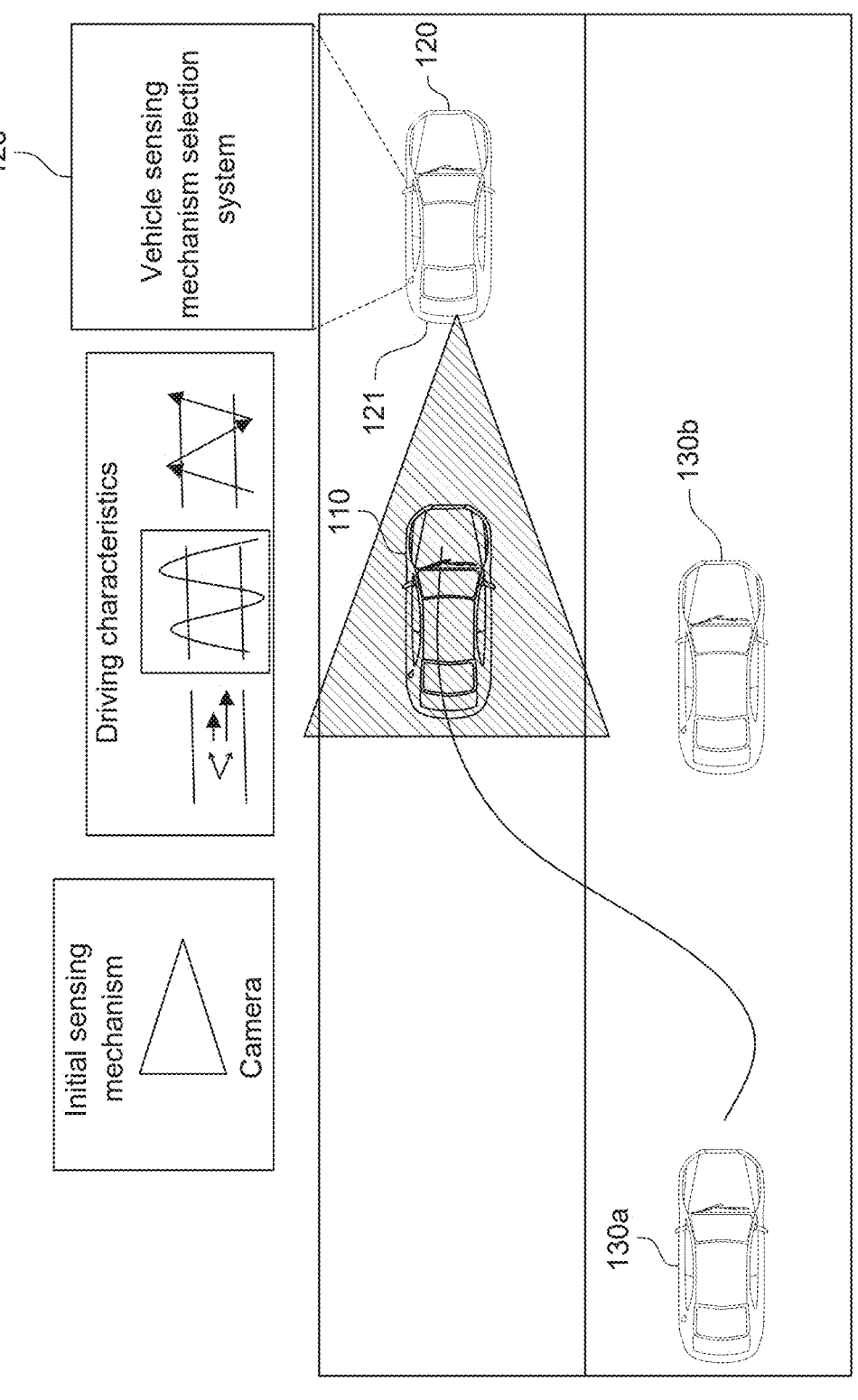
FIG. 1A is an example road environment including a vehicle implementing a vehicle sensing mechanism selection system, in accordance with an embodiment of the technology disclosed herein.

The figures are not exhaustive and do not limit the present disclosure to the precise form disclosed.

DETAILED DESCRIPTION

Some vehicles include computer-controlled operational modes, such as vehicles having adaptive cruise control mode and automated vehicles, in which a computing system is used to navigate and/or maneuver the vehicle along a travel route. During adaptive cruise control operation, for example, the driving speed of the vehicle can be limited by various factors, such as traffic congestion (e.g., preceding vehicles travelling at slower speeds, preceding vehicles stopped). In another example, many existing vehicle navigation systems alert a driver of the presence of traffic along an intended route, in order to provide traffic related information that may be pertinent to driving, such as alternate routes, time delay estimations, or automated driving actions.

Furthermore, vehicles can include advancements and innovations in safety that help prevent crashes, collisions, and other dangerous conditions in order to protect drivers and passengers. For example, some vehicles are equipped with technology, such as computer-controlled vehicle safety systems and collision avoidance systems, that are designed to support driver awareness, decision making and vehicle operation over a wide range of speeds. Unsafe driving detection can be a feature implemented by the aforementioned computer-controlled vehicle safety systems and collision avoidance systems of some vehicles currently on the market.

Unsafe driving detection systems and capabilities refer to computer-controlled vehicle technology that is designed to identify and alert drivers about nearby vehicles that may compromise road safety. These systems often use vehicle sensors and algorithms to detect suspicious or potentially dangerous driving actions of proximately located vehicles. Computer-controlled vehicle safety systems, including unsafe driving detection, can be crucial in solving such vehicle traffic related problems, and can allow for drivers and/or vehicles to make the right adjustments to make congestion easy to manage and reduce collisions, injuries, and other potential hazards. For example, an unsafe driving detection system can be designed to automatically perform real-time and/or predictive detection of any unsafe driver behavior, such as speeding, abrupt lane changes, or erratic driving patterns, that is being exhibited by a subject vehicle traveling in an adjacent lane on a highway, in a manner that assists the vehicle (or manual driver) to maneuver away from any detected unsafe drivers and potentially avoid collisions.

Vehicle sensor systems (also referred to herein as vehicle sensing mechanisms) serve as the basis for the aforementioned computer-controlled vehicle safety capabilities, including unsafe driver detection and collision avoidance. However, for many existing vehicles, there is typically one fixed vehicle sensor system that is statically preset to be used for detecting the surrounding driving environment. For example, it may be preset for a vehicle to only utilize its rear camera system for its unsafe driver detection features. Thus, in real world scenarios, where the vehicle encounters a vast range of driving conditions that change dynamically, vehicles are often limited to static sensing with only one preset fixed vehicle sensor system. This fixed sensing can be problematic, as certain vehicle sensor systems are not well suited for specific driving conditions and can experience interrupted or ineffectively short-term observation collection.

For example, with a conventional unsafe driver detection system, a rear camera system of a vehicle can be statically preset as the only vehicle sensing mechanism used to collect image data of a driving environment in real-time, which is analyzed to ultimately detect when there is erratic driving of another nearby vehicle and alerts when an unsafe driver is deemed to be detected. In an example real-life scenario, a subject vehicle may exhibit unsafe driving behavior by weaving back and forth between adjacent lanes and vehicles at a high speed in a potentially dangerous manner. In many cases, a subject vehicle that is maneuvering on the road with this type of erratic speeding and weaving behaviors should be deemed as an "unsafe vehicle" by the unsafe driver detection system of an ego vehicle. However, as the subject vehicle weaves, it may stay within the same lane of the ego vehicle (e.g., in the detection range of the ego vehicle's rear camera) for only a short amount of time before the subject vehicle quickly swerves into another adjacent lane (e.g., outside of the detection range of the ego vehicle's rear camera). As the subject vehicle continues to weave in-and-out of lanes around the ego vehicle, it can cause the ego's vehicle observation of the subject vehicle to be severely interrupted. That is, the subject vehicle is only visible to the rear camera of the ego vehicle in short spurts of time, only when the subject vehicle quickly enters the same lane as the ego vehicle throughout its weaving lane changes. Interrupted or short duration observations can limit the amount of useful data that is obtained about a subject vehicle potentially for further analysis by the unsafe driver detection system. Referring back to the swerving vehicle example, the ego vehicle having a conventional unsafe driver detection system may not have obtained enough information about the subject vehicle from only employing its rear camera system. As a result, the convention unsafe driver detection system may fail to detect the subject vehicle as an unsafe vehicle and alert the driver, even though the subject vehicle is exhibiting unsafe and potentially dangerous maneuvering behavior.

Thus, in scenarios where the amount of data collected by a conventional unsafe driver detection system is substantively restricted due to the static preselection of a single vehicle sensing mechanism (e.g., rear camera system) such as a swerving vehicle, a conventional unsafe driver detection system may yield misleading or insufficient conclusions about a potentially unsafe vehicle, which reduces the overall effectiveness and accuracy of many conventional unsafe driver detection systems. Further, in these scenarios, the poor performance of conventional unsafe driver detection systems with statically preset sensing mechanisms places drivers of these vehicles at greater risk of collision and/or injury.

As disclosed herein, a vehicle sensing mechanism selection system is implemented which addresses the problems and limitations experienced by many conventional unsafe driver detection systems. The disclosed vehicle sensing mechanism selection system is designed to intelligently determine which sensing mechanism (e.g., vehicle sensor system) of a vehicle is optimal for unsafe driver detection based on the driving conditions, such as the driving characteristics of a subject vehicle. Additionally, the vehicle sensing mechanism selection system has the capability to dynamically change the vehicle's operation in real-time to the selected sensing mechanism deemed optimal for the current situation (e.g., detected driving conditions, detected driving characteristics of a subject vehicle). Since the vehicle sensing mechanism selection system has the distinct capability to dynamically adapt which of the vehicle's sensing mechanisms are utilized for a specific driving sce-
nario in real-time, the disclosed system realizes various
advantages over the current technology. The vehicle sensing
mechanism selection system, as disclosed herein, can miti-
gate interruptions and strengthen data collection (e.g., longer
periods of data gather and/or increased amounts of data)
while observing a subject vehicle, which provides sufficient
and accurate analysis of a subject vehicle and ultimately
improves accuracy of the vehicle's unsafe driver detection
system's ability to identify whether the subject vehicle is
being driven in a unsafe manner. Additionally, in some
embodiments, the vehicle sensing mechanism selection sys-
tem may determine one or more computer-controlled vehicle
safety actions for automated collision avoidance based on
the positive detection of an unsafe driver. Accordingly, the
disclosed vehicle sensing mechanism selection system and
its distinct functions can enhance a vehicle's safety features
and increases the likelihood that crashes, collisions, and
other dangerous conditions are avoided in order to protect
drivers/passengers and prevent damage to vehicles on the
road.

Figure 1B:
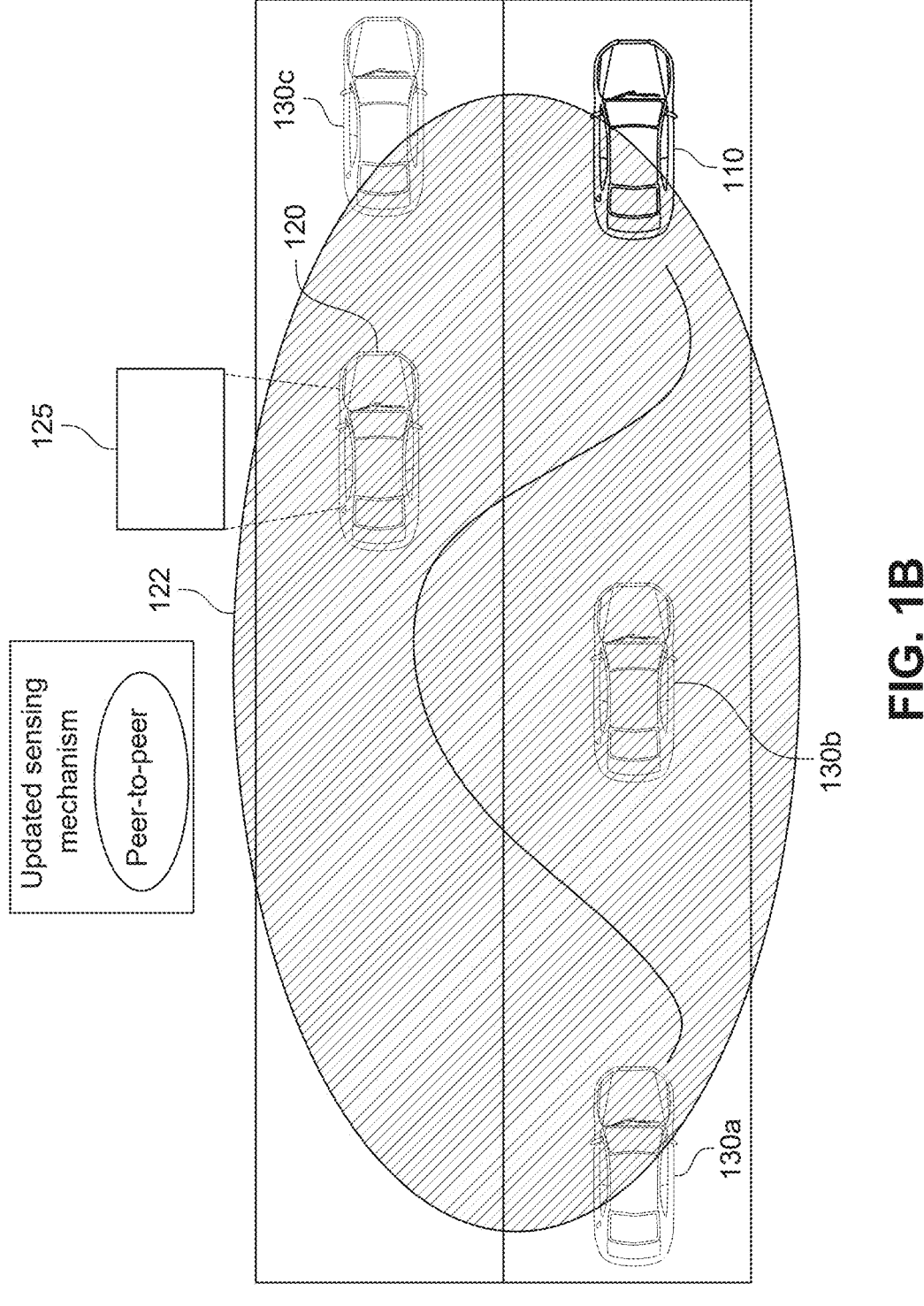
FIG. 1B is an example road environment including the vehicle implementing the vehicle sensing mechanism selection system in FIG. 1A updating the sensing mechanism for the vehicle based on driving conditions, in accordance with an embodiment of the technology disclosed herein.

Referring now to FIGS. 1A-1B, an example of a road
environment 100 is depicted, which includes a vehicle 120
that is configured to implement the vehicle sensing mecha-
nism selection system 125 and capabilities, as disclosed
herein. FIGS. 1A-1B illustrate an example of a road envi-
ronment, shown as a two-lane highway, having a plurality of
vehicles being driven thereon, including: a subject vehicle
110, an ego vehicle 120, and proximate vehicles 130A-130C
also traveling on the road. At least one of the plurality of vehicles, particularly ego vehicle 120, is configured to
implement collision avoidance and/or unsafe driving detec-
tion, including the vehicle sensing mechanism selection
functions, as disclosed herein. Particularly, in FIGS. 1A-1B,
the ego vehicle 120 is depicted as being equipped with the
vehicle sensing mechanism selection system 125. FIG. 1A
depicts that while the ego vehicle 120 is being driven, it is
surrounded by the subject vehicle 110, and proximate
vehicles 130A-130C in the adjacent lanes within its vicinity.
This is a common road environment in several different real
life scenarios, for instance driving during rush hours, driving
in densely populated areas (e.g., metropolitan areas), and the
like.

FIGS. 1A-1B show the subject vehicle 110 as being
maneuvered by its driver along the highway in a potentially
unsafe manner in the road environment 100. Generally,
FIGS. 1A-1B depict the subject vehicle 110 exhibiting
several unsafe driving characteristics that include improper
lane changing, unsafe vehicle passing, and speeding. In the
example of FIGS. 1A-1B, the subject vehicle 110 is being
driven by an unsafe driver, who is dangerously swerving the
subject vehicle 110 in-and-out of the two lanes in an attempt
to speed around proximate vehicle 130B and the ego vehicle
120A on the highway (e.g., proximate vehicle 130B and the
ego vehicle 120A are positioned upstream from the initial
position of subject vehicle 110). FIG. 1A illustrates a first
stage of this driving scenario within the road environment
100, where the unsafe driver swerves the subject vehicle 110
out of a first lane (e.g., right) of the two-lane highway where
it was initially positioned in front of a proximate vehicle
130A. The subject vehicle 110 then moves into a second lane
(e.g., left) of the freeway and being positioned directly
behind ego vehicle 120 in this second lane, and next to
vehicle 130B that is being driven in the adjacent first lane of
the highway. FIG. 1B illustrates a subsequent second stage
of the "swerving" driving scenario within the road environ-
ment 100. In FIG. 1B, after previously swerving into the second lane (e.g., left), the unsafe driver then swerves the
subject vehicle 110 out of the second lane (e.g., left) and
back into the first lane (e.g., right) of the freeway in order to
speed pass ego vehicle 120. This dangerous swerving allows
the subject vehicle 110 to continue farther up the highway
(e.g., bypassing slower moving vehicles 130B and 120)
driving at a dangerously high rate of speed to be positioned
next to another proximate vehicle 130C ahead in the adja-
cent first lane (vehicle 130C was previously upstream from
the subject vehicle's 110 initial position in FIG. 1A).

Referring back to FIG. 1A, while the ego vehicle 120 is
operational, for instance being driven on the freeway, the
ego vehicle 120 may be traveling at a certain speed in a lane
on the road. As depicted in FIG. 1, the subject vehicle 110
is positioned directly behind vehicle 120 for a short duration
of time. That is, while the subject vehicle 110 is unsafely
swerving between lanes, there is a brief time period when
both the ego vehicle 120 and the subject vehicle 110 are
being driven in the same lane (e.g., left lane of the two-lane
freeway). During this time, the subject vehicle 110 is posi-
tioned directly behind the ego vehicle 120 within the same
lane, which is suitable for the ego vehicle 120 to employ its
rear camera system 121 to collect sensor data associated
with the subject vehicle 110 and its movement. In the
example, the ego vehicle 120 is equipped with a rear camera
system 121 that is configured to have sensing capabilities
that cover an immediate area behind the vehicle 120. For
example, the rear camera system 121 can obtain image data
(e.g., images and/or video) of the subject vehicle 110 within
a distance range of approximately 10-30 feet (3-9 meters)
and with a field-of-view (FOV) in a range of approximately
120°-180° depending on the specific camera and system
specifications. Thus, the rear camera system 121 can be the
vehicle sensing mechanism of the ego vehicle 120 that is
most optimal for such close-range detection. Consequently,
FIG. 1A depicts that the initial vehicle sensing mechanism
utilized by the ego vehicle 120 is the rear camera system
121. In some embodiments, the vehicle sensing mechanism
selection system 125 can initially sense that a vehicle,
namely the subject vehicle 120, is within the operational
range of its rear camera system 121 and thus employs it to
begin to collect data on the subject vehicle 110 for further
analysis (e.g., detecting unsafe driving) for this short time
period while the subject vehicle 110 is traveling at a close
distance behind the ego vehicle 110 in the same lane.
However, once the subject vehicle 110 quickly swerves out
of this shared lane with the ego vehicle 120, the data being
collected by the rear camera system 121 is interrupted as the
subject vehicle 110 has moved to a distance outside of its
operational range and FOV. In other words, once the subject
vehicle 120 is in the position shown in FIG. 1B (e.g., greater
distance from ego vehicle 120 and in front of ego vehicle
120) the rear camera system 121 of the ego vehicle 120 is no
longer capable of obtaining any image data on the subject
vehicle 110. As previously described, this type of interrup-
tion and/or ineffectively short time period can limit the
amount of useful data that is obtained, and ultimately
decreases the accuracy of unsafe driver detection. However,
the ego vehicle 120 is equipped with the disclosed vehicle
sensing mechanism selection system 125. As a general
description, the vehicle sensing mechanism selection system
125 is configured to detect one or more driving conditions,
including driving characteristics of the subject vehicle 110,
and then dynamically selects which sensing mechanism of
the ego vehicle 120 that is deemed most optimal in this
scenario, based on the driving conditions. Additionally, in
some embodiments, the initial vehicle sensing mechanism that is utilized by the ego vehicle 120 is a vehicle parameter that is a default preset and/or selected prior to vehicle deployment.

Referring back to FIG. 1A, the ego vehicle 120 can also utilize the initial vehicle sensing mechanism, namely the rear camera system 121 in this example, in order for the vehicle sensing mechanism selection system 125 to determine in real-time one or more driving conditions that may affect how data associated with observing the subject vehicle 110 is collected. In an embodiment, the rear camera system 121 may collect image data that indicates the surrounding environment and/or conditions on the road that can impact data collection. For example, from the ego vehicle's 120 sensing capabilities, the vehicle sensing mechanism selection system 125 can determine in real-time that there is currently heavy snow in the vehicle's 120 surrounding environment which can adversely affect performance of the rear camera system 121 and its ability to accurately detect whether the subject vehicle 110 is being driven unsafely. In the example of FIG. 1A, the ego vehicle 120 can utilize its rear camera system 121 to observe the subject vehicle 110 in real-time. Subsequently, by analyzing the obtained data, the vehicle sensing mechanism selection system 125 can determine that the subject vehicle 110 is exhibiting a particular driving characteristic of "S" shaped swerving. For purposes of discussion, the driving conditions observed by the vehicle sensing mechanism selection system 125 are described in the disclosure as driving characteristics of the subject vehicle 110. Examples of parameters, factors, measurements and conditions that can be considered driving characteristics of a subject vehicle that are identified and/or determined by the vehicle sensing mechanism selection system 125 can include, but are not limited to: vehicle movement pattern (e.g., periodic and non-periodic actions, shape of movement); recurrence of the movement pattern (e.g., how often the driver performs the movement); period of the pattern (e.g., time, day, road type); number of lanes driving characteristics of the subject vehicle extended; and the like. The vehicle sensing mechanism selection system 125 can use the aforementioned characteristics in order to further identify a category for a driving characteristic associated with a subject vehicle, where the category groups the various driving characters (e.g., direction, speed, etc.) together on a granular level into a more general and definable vehicle maneuver. In some embodiments, the vehicle sensing mechanism selection system 125 is configured to detect several categories/maneuvers for driving characteristics of the subject vehicle that include, but are not limited to: nudging; "S" shaped swerving; "Zig-Zag" swerving; in-lane swaying; and the like.

For purpose of discussion, the ego vehicle 120 is described as having the capability to detect the driving characteristics of the subject vehicle 110. However, it should be appreciated that this example is not intended to be limiting and the driving characteristics of a subject vehicle can be detected using several different approaches, including a plurality of vehicles, a remote server (e.g., performing time series analysis to infer the driving characteristics of the subject vehicle), and the like, without departing from the scope and function of the disclosed embodiments.

Again, referring back to FIG. 1A, the vehicle sensing mechanism selection system 125 employs its rear camera system 121 to detect several driving characteristics associated with the subject vehicle 110, such as velocity, acceleration/deceleration, angular movement, movement patterns, and the like. In the example, the vehicle sensing mechanism selection system 125 ultimately determines that the subject vehicle 120 is maneuvering in a manner that is defined by the system 125 as an "S" shape swerving. In some embodiments, the vehicle sensing mechanism selection system 125 also has the capability to derive supplemental information that provides even further details and/or specificity regarding the observed driving characteristics of the subject vehicle 110, such as the swerving repeats every 3 seconds, the swerving occurs within two lanes, and the like.

After detecting the driving characteristics of the subject vehicle 110, the vehicle sensing mechanism selection system 125 can then dynamically determine which vehicle sensing mechanism is deemed optimal for the particular scenario which involves the current movement of the subject vehicle 110. FIG. 1B depicts that in the example, the vehicle sensing mechanism selection system 125 has determined in real-time that another vehicle sensing mechanism is more optimal, namely the ego vehicle 120 forming a peer-to-peer network 122 with nearby vehicles 130A-130C (having vehicular networking capabilities) in order to provide a distributed observation of the subject vehicle 110 from the perspective of several proximate vehicles. Subsequently, the vehicle sensing mechanism selection system 125 has updated the vehicle sensing mechanism that is used to observe the subject vehicle 110 from the previously employed rear camera system 121 (e.g., initial vehicle sensing mechanism) to vehicle sensing using the peer-to-peer network 122 based on detecting that the subject vehicle 110 is currently swerving. Employing the peer-to-peer network 122 for unsafe driving detection offers decentralized communication among the proximately located vehicles 130A-130C and the ego vehicle 120. Accordingly, each of these vehicles 120, 130A-130C can utilize their respective sensors to obtain sensing data on the subject vehicle 110 that is communicatively shared via the peer-to-peer network 122. The proximate vehicles 130A-130C actively obtain information about the subject vehicle's 110 movement in real-time, which may indicate erratic behavior and/or potentially dangerous driving, that is then communicated to the ego vehicle 120 for further analysis to support its unsafe driving detection features. By utilizing the peer-to-peer network 122 as the vehicle sensing mechanism in this case, a larger range of distance can be covered by the peer-to-peer network 122 (as compared to the rear camera system 121) in observing the subject vehicle 110. In other words, after the vehicle sensing mechanism selection system 125 dynamically changes the sensing mechanism to the peer-to-peer network 122, the adjustment enables data to be collected on the subject vehicle 110 that otherwise would not have been obtained by the ego vehicle 120 (e.g., during the multiple time periods when the subject vehicle 110 is positioned outside of the range of its rear camera system 121). Consequently, the vehicle sensing mechanism selection system 125 improves the overall performance of its unsafe driving detection features by dynamically changing and/or updating the sensing mechanism that the ego vehicle 120 applies to a scenario in real-time. As illustrated in the example of FIGS. 1A-1B, the vehicle sensing mechanism selection system 125 overcomes the substantive loss of data (e.g., caused by interruptions or short/partial observation durations) that would have been experienced in this scenario by conventional systems that are limited to using a single fixed sensing mechanism.

In an embodiment, the vehicle sensing mechanism selection system 125 can be configured with a predetermined and/or predefined relationship between the detected driving characteristics of the subject vehicle and a corresponding vehicle sensing mechanism that is ultimately employed. In some embodiments, the vehicle sensing mechanism selection system 125 can be configured to implement various rules, tables, data structures, logic trees, algorithms, etc. that provide defined relationships for selecting a particular sensing mechanism and/or a data collection mechanism based on the detected driving characteristics for the subject vehicle. Examples of vehicle sensing mechanism that can be selected by the vehicle sensing mechanism selection system 125 include, but are not limited to: peer-to-peer network; rear camera system; radar system; LIDAR system; a combination thereof; and the like. The vehicle sensing mechanism selection system 125 may also recognize other parameters that may be pertinent to vehicle movement in order to implement the defined relationships to a corresponding vehicle sensing mechanism. Examples of parameters that can be for a defined correspondence to a vehicle sensing mechanism includes, but are not limited to: vehicle type (e.g., passenger car, SUV, truck); movement pattern (e.g., shape of movement); number of lanes impacted by the subject vehicle; degree of interruption (e.g., low, moderate, severe) of sensing and driving data collection, where sensing and driving data collection is interrupted every second (i.e., severe), camera performance degradation in sunlight, radar reflection on bridges, tunnels (i.e., low), and latency and packet loss of peer-to-peer network-based sensing and data collection (i.e., moderate); and the like.

Referring back to the example, after the vehicle sensing mechanism selection system 125 detects that the subject vehicle 110 has a driving characteristic of "S" shape swerving on the road, the vehicle sensing mechanism selection system 125 can subsequently access a defined table therein with a matching rule that indicates the "S shape swerving" value for the driving characteristic parameter is corresponds to the "peer-to-peer network" value for the vehicle sensing mechanism parameter. Accordingly, the vehicle sensing mechanism selection system 125 can determine that the peer-to-peer network is the most optimal vehicle sensing mechanism for the current scenario, based on detecting that the subject vehicle 110 is swerving on the road.

In another embodiment, the vehicle sensing mechanism selection system 125 is configured to implement Artificial Intelligence (AI)/Machine Learning (ML) techniques in order to select a vehicle sensing mechanism. For example, the vehicle sensing mechanism selection system 125 has ML models that are trained to learn which vehicle sensing mechanisms are optimal over time, in pervious situations where particular driving characteristics of the subject vehicle have been observed. As a result, the ML can infer a relationship to predict the most optimal vehicle sensing mechanism and/or data collection strategy based on driving characteristics of the subject vehicle in a current environment.

According the embodiments, the vehicle sensing mechanism selection system 125 functions in corporation with a computer-controlled operational modes, such as unsafe driver detection. Referring back to the example of FIGS. 1A-1B, the vehicle sensing mechanism selection system 125 can employ the peer-to-peer network 122 to obtain data associated with observing the movement of subject vehicle 110 which is fed as input into a unsafe driver detection system of the ego vehicle 120. The ego vehicle's 120 unsafe driver detection system can then analyze this data on the subject vehicle 110 in order to ultimately determine whether the subject vehicle 110 has characteristics where it is deemed, or otherwise identified/detected, as an unsafe driver. Additionally, the ego vehicle 120 can employ its unsafe driver detection system to effectuate autonomous or semi-autonomous actions in response to detecting that the subject vehicle 110 is an unsafe driver, which facilitate vehicle/driver safety in avoiding an unsafe driving and/or mitigating a potential collision. Accordingly, in response to detecting that the subject vehicle 110 is swerving on the road in an unsafe manner, the ego vehicle 120 can automatically perform one or more preventative maneuvers to avoid unsafe drivers and/or prevent collisions with other vehicles. Examples of actions that the ego vehicle 120 can execute in response to detecting an unsafe driver, include, but are not limited to: emergency braking; evasive maneuvers; acceleration/deceleration; lane change; communication; obstacle detection and tracking; predictive analysis; and the like. In some embodiments, the ego vehicle 120 implementing the vehicle sensing mechanism selection system 125 can perform other computer-controlled functions related to unsafe driver detection features. For example, the ego vehicle 120 can generate notifications, warnings, alerts, and other visual, audio, and tactile outputs that enable drivers to make safer actions in operating the vehicle, and provide additional reaction time for unexpected changes on the road. Furthermore, the ego vehicle 120 can generate messages, notifications, warnings, alerts, for operators of other connected vehicles that may be traveling on the road within its vicinity, such as vehicles in the section of the road where vehicle 120 is currently traveling (e.g., within range of the wireless communication technology). For instance, these messages transmitted from vehicle 120 to other connected vehicles 130A-130C that to notify the respective vehicles that the subject vehicle 110 has been detected as an unsafe driver. In some implementations, the messages that are communicated to other connected vehicles further also effectuate automated (or semi-automated) maneuvers of these vehicles.

Although the example described with reference to FIGS. 1A-1B is a type of autonomous vehicle, the systems and methods described herein can be implemented in other types of vehicles including semi-autonomous vehicles, vehicles with automatic controls (e.g., dynamic cruise control), or other vehicles. Also, the ego vehicle 120 implementing the vehicle sensing mechanism selection system 125 described with reference to FIGS. 1A-1B is a type of hybrid electric vehicle (HEV). However, this is not intended to be limiting, and the disclosed embodiments can be implemented in other types of vehicles including gasoline- or diesel-powered vehicles, fuel-cell vehicles, electric vehicles, or other vehicles.

According to an embodiment, vehicles implementing the vehicle sensing mechanism selection system 125 (shown as ego vehicle 120) can be a semi-autonomous vehicle, such as a vehicle having assisted driving capabilities, which also implements the vehicular knowledge networking and improved knowledge cycle functions, as disclosed herein. "Semi-autonomous operational mode" means that a portion of the navigation and/or maneuvering of the vehicle 120 along a travel route is performed by one or more computing systems, and a portion of the navigation and/or maneuvering of the vehicle 120 along a travel route is performed by a human driver. One example of a semi-autonomous operational mode is when an adaptive cruise control system is activated. In such case, the speed of a vehicle 120 can be automatically adjusted to maintain a safe distance from a vehicle ahead based on data received from on-board sensors, but the vehicle 120 is otherwise operated manually by a human driver. Upon receiving a driver input to alter the speed of the vehicle (e.g., by depressing the brake pedal to reduce the speed of the vehicle), the speed of the vehicle is reduced. Thus, with vehicle 120 operating as a semi-autonomous vehicle, a response can be partially automated. In an example, the controller communicates a newly generated (or updated) control to the vehicle 120 operating as a semi-autonomous vehicle. The vehicle 120 can automatically perform some of the desired adjustments (e.g., accelerating) with no human driver interaction. Alternatively, the vehicle 120 may notify a driver that driver input is necessary or desired in response to a new (or updated) safety control.

Alternatively, or in addition to the above-described modes, vehicles implementing the disclosed vehicle sensing mechanism selection system 125 (shown as ego vehicle 120) can have one or more autonomous operational modes. As used herein, "autonomous vehicle" means a vehicle that is configured to operate in an autonomous operational mode. "Autonomous operational mode" means that one or more computing systems of the vehicle 120 are used to navigate and/or maneuver the vehicle along a travel route with a limited level of input from a human driver which varies with the operational mode. As such, vehicle 120 can have a plurality of autonomous operational modes, where each mode correspondingly responds to a controller, with a varied level of automated response. In some embodiments, the vehicle 120 can have an unmonitored autonomous operational mode. "Unmonitored autonomous operational mode" means that one or more computing systems are used to maneuver the vehicle along a travel route fully autonomously, requiring no input or supervision required from a human driver. Thus, as an unmonitored autonomous vehicle 120, responses can be highly, or fully, automated. For example, a controller can be configured to communicate controls so as to operate the vehicle 120 autonomously and safely. After the controller communicates a control to the vehicle 120 operating as an autonomous vehicle, the vehicle 120 can automatically perform the desired adjustments (e.g., accelerating or decelerating) with no human driver interaction. Accordingly, vehicle 120 can operate any of its components autonomously, such as an engine.

FIGS. 1A-1B depict the subset of vehicles on the roadway that have wireless communication capabilities, namely vehicles 130A-130C and vehicle 120. In some embodiments, vehicles 130A-130C and ego vehicle 120 are also sensor-rich vehicles (SRVs) that are equipped with advanced vehicles sensors, described herein as ranging sensors (e.g., cameras, LIDAR, radar, ultrasonic sensors) and, in some cases, advanced computational resources. Particularly in the example of FIG. 1A-1B, vehicles 130A, 130B, 130C, and 120 are implemented as SRVs. Accordingly, as SRVs, vehicles 130A-130C and ego vehicle 120 are enabled to utilize these advances sensors to sense various conditions on the roadway, and obtain data that is pertinent to traffic detection, such as, but not limited to: vehicle identifiers; the presence of other vehicles; vehicle position; vehicle speed; vehicle movement; vehicle motion direction; road data; lane data; vehicle acceleration; other static and dynamic objects; image data; planned route data; generated HD local map; processed perception data; and the like. Another subset of the plurality of vehicles in the road environment can be legacy vehicles (LVs) that have limited sensor and/or communication capabilities in comparison to the SRVs. Alternatively, the vehicles may be legacy vehicles that have some sensors that are capable of sensing and limited communication of more basic types of vehicle data, such as vehicle identifiers, vehicle location, vehicle speed, vehicle acceleration, and the like. For instance, a vehicle can be a legacy vehicle that includes Global Positioning System (GPS) sensors, which can provide the basic location, velocity, and acceleration of the vehicle.

Additionally, FIG. 1B illustrates a peer-to-peer network 122, which establishes wireless connections between communicatively connected vehicles, shown in FIG. 1A as vehicles 130A-130C, and 120, within the same vicinity (e.g., within wireless network range) on the roadway. Due to this wireless connectivity, data can be communicated between the connected vehicles, where the data can include information such as sensor messages, maneuver messages, basic safety messages and the like. Sensor messages can include data collected by the vehicle sensors of SRVs and LVs, and other related data that may be obtained from sensors and/or devices on-board the vehicle. In some embodiments, sensor messages are implemented as a general class of wireless messages exchanged between road users and infrastructure that contains information about the objects detected in the surrounding environment. Examples could be the Sensor Data Sharing Messages standardized by SAE or the Collective Perception Messages standardized by ETSI. Maneuver messages, in some implementations, are a general class of wireless messages exchanged between road users and infrastructure that contains the future trajectory (or possible future trajectories) of the transmitting road user. Examples of such messages could be the Maneuver Coordination Message (MCM) undergoing standardization by ETSI or the Maneuver Sharing Coordination Message (MSCM) currently being standardized by SAE. Additionally, basic safety messages can be implemented as wireless messages transmitted between vehicles, where the transmitter sends its position, speed and other static/dynamic information. Basic safety messages type of message is standardized by SAE, and we do not claim it as a novelty of the invention.

As previously described, connected vehicles are configured to utilize types of wireless networking technology that are suitable for vehicles to form peer-to-peer network 122, which enables a vehicle to wirelessly communicate with other vehicles, infrastructure, and communication points. In the example of FIG. B1, vehicles 130A-130C and ego vehicle 120 are equipped with vehicle-to-vehicle (V2V) communication capabilities. Thus, vehicles 130A-130C and ego vehicle 120 utilize V2V communication ability to form a peer-to-peer communication network 122 (as the vehicles are within range for V2V-based wireless communication), and wirelessly exchange information, such as maneuver messages, sensor data (e.g., speed and position of surrounding vehicles), and the like. That is, in the road environment 100 of FIG. 1B, V2V enables at least a subset of the vehicles traveling within the same general section of the freeway (e.g., vehicles 130A-130C and ego vehicle 120) to be able to communicate with each other. Vehicle 120 can receive and analyze data that is communicated over the formed wireless communication network 122, and employ other vehicle components and/or systems, such as the vehicle sensing mechanism selection system 125, to help perform automated actions that avoids unsafe drivers, crashes, eases traffic congestion, and overall improves the road environment 100.

In some embodiments, the connected vehicles, namely vehicles 130A-130C, and 120, are configured to utilize other forms of wireless networking technology, such as vehicle-to-infrastructure (V2I) and/or vehicle-to-everything (V2X) capabilities. Accordingly, vehicles 130A-130C, and 120 can employ V2I and/or V2X communication to wireless exchange additional data between the vehicles and road infrastructure. Thus, in some cases, road environment 100 may include infrastructure components such as lane markings, road signs, and traffic lights which can wirelessly provide information to the vehicle, and vice versa. Consequently, the data communicated to/from connected vehicles can include additional data obtain from these infrastructure components in V2I and/or V2X communication, allowing the vehicle sensing mechanism selection system 125 to have a vast amounts real-time, information rich, data that is related to road safety, energy savings, and traffic efficiency on the roads in order to further enhance the accuracy and the overall performance of its traffic congestion mitigation functions. In some embodiments, the vehicle 120 is further configured to employ the bidirectional communication of V2I and/or V2X to also provide the roadside units, cloud/edge servers, and traffic monitoring centers, with notifications of traffic congestion that it has detected and mitigative maneuvers (e.g., control actions) to be performed, when required and/or requested from the infrastructure.

Particularly, vehicle 120 is shown to include a vehicle sensing mechanism selection system 125. The vehicle sensing mechanism selection system 125 can be implemented as a vehicle controller, computing hardware, software, firmware, or a combination thereof, which is programmed to select actions for vehicles to mitigate traffic congestion in accordance with the disclosed techniques. The vehicle sensing mechanism selection system 125 may be a standalone controller in some embodiments. Alternatively, the vehicle sensing mechanism selection system 125 may be implemented by configuring a main vehicle onboard processor or CPU. As previously described, vehicle 120 can obtain data from its vehicle sensors or the other communicatively connected vehicles 130A-130C on the road, via wireless network connectivity. This data communicated from connected vehicles can be cooperatively fused and serve as input to the vehicle sensing mechanism selection system 125, in some cases.

Figure 2A:
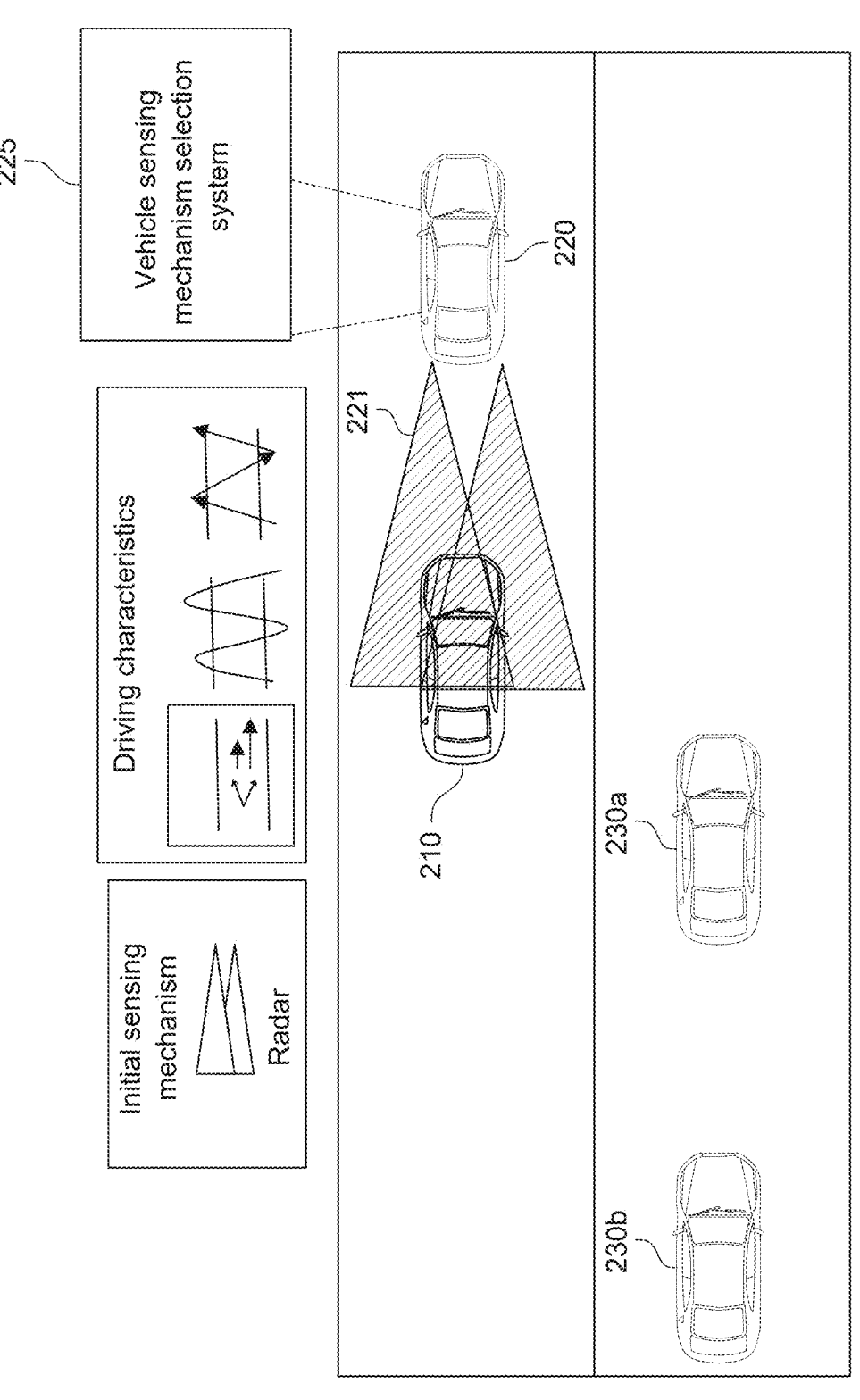
FIG. 2A is another example road environment including a vehicle implementing the vehicle sensing mechanism selection system, in accordance with an embodiment of the technology disclosed herein.
Figure 2B:
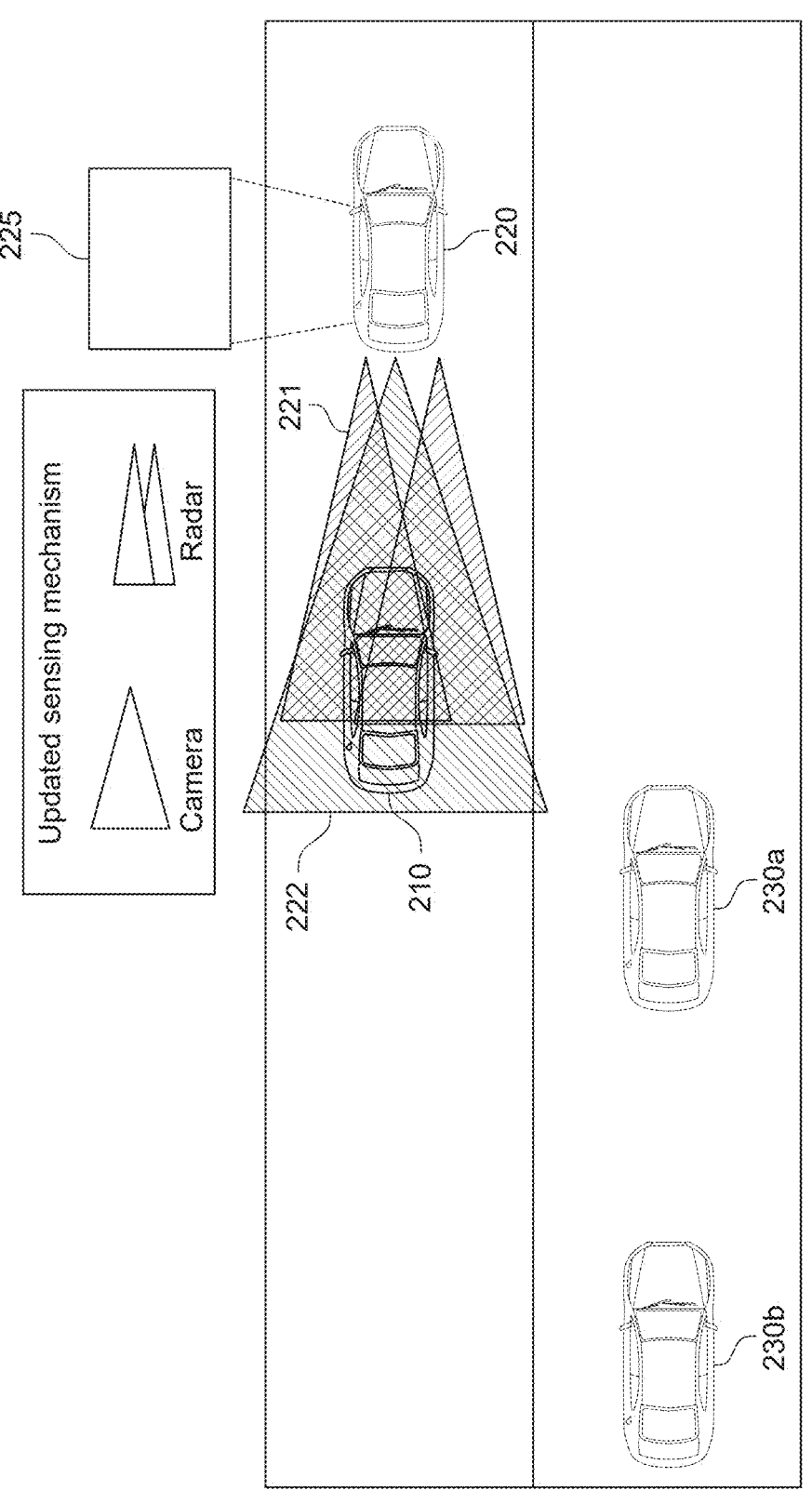
FIG. 2B is an example road environment including the vehicle implementing the vehicle sensing mechanism selection system in FIG. 2A updating the sensing mechanism for the vehicle based on driving conditions, in accordance with an embodiment of the technology disclosed herein.

Referring now to FIGS. 2A-2B, another example of a road environment 200 is depicted, which includes a vehicle 220 that is configured to implement the vehicle sensing mechanism selection system 225 and capabilities, as disclosed herein. FIGS. 2A-2B illustrate an example of the road environment 200, shown as a two-lane highway, having a plurality of vehicles being driven thereon, including: a subject vehicle 210, an ego vehicle 220, and proximate vehicles 230A-230B also traveling on the road. Particularly, in FIGS. 2A-2B, the ego vehicle 220 is depicted as being equipped with the vehicle sensing mechanism selection system 225. FIGS. 2A-2B depicts the subject vehicle 210 being maneuvered by its driver along the highway in a potentially unsafe manner in the road environment 200. As a general description, FIGS. 2A-2B show the subject vehicle 210 exhibiting several unsafe driving characteristics including nudging the ego vehicle 220. As referred to herein, nudging can involve a trailing vehicle suddenly increasing their speed to travel at a dangerously close distance behind a proceeding vehicle and then abruptly backing off by decelerating. In the example of FIGS. 2A-2B, the subject vehicle 210 is being driven by an unsafe driver, such that the subject vehicle 210 is positioned directly behind the ego vehicle 210 in the same lane (e.g., left lane). The subject vehicle 210 is exhibiting unsafe behavior as it is continuously nudging the ego vehicle 220 in an attempt to aggressively cause the driver of the ego vehicle 220 to increase their speed. FIG. 2A illustrates a first stage of this driving scenario within the road environment 200, where the subject vehicle 210 first begins to nudge the ego vehicle 220. The subject vehicle 210 is initially positioned at a greater distance from the ego vehicle 220 in FIG. 2A. As seen in FIG. 2B, the unsafe driver has quickly increased their speed to be positioned at a dangerously close distance behind the ego vehicle 220. This nudging maneuver that is exhibited by the subject vehicle 210 is dangerous, because failing to maintain a safe and stable distance from a proceeding vehicle at a high speed can significantly increase the likelihood of collision.

In FIG. 2A, the ego vehicle 220 initially employs its radar system 221 as the initial vehicle sensing mechanism used to observe the movement of the subject vehicle 210 on the highway. Thus, the ego vehicle 220 can utilize the initial vehicle sensing mechanism, namely the radar system 221, begin to collect sensor data associated with how the subject vehicle 210 is currently maneuvering. Obtaining the sensor data on the subject vehicle 210 then enables the vehicle sensing mechanism selection system 225 to detect certain driving characteristics of the subject vehicle 210. In this example, the vehicle sensing mechanism selection system 225 can analyze various measurements that are indicated by the collected data, such as the subject vehicle's 210 distance from the ego vehicle 220 and speed, in order to ultimately determine that the subject vehicle 210 has a driving characteristic that is defined as "nudging."

Referring back to the example, after the vehicle sensing mechanism selection system 125 detects that the subject vehicle 210 has a driving characteristic of nudging, the vehicle sensing mechanism selection system 225 can subsequently utilize defined rules or an AI/ML approach in order to determine that identifying the "nudging" driving characteristic for a subject vehicle corresponds to selecting the "rear camera and rear radar" as the most optimal vehicle sensing mechanism for the current conditions. Thus, as seen in FIG. 2B, the vehicle sensing mechanism selection system 225 can dynamically update the vehicle sensing mechanism that the ego vehicle 220 is applying to observe the subject vehicle 220. That is, the vehicle sensing mechanism selection system 225 switches from using the radar system 221 as the initial vehicle sensing mechanism, to utilizing both the radar system 221 and the rear camera system 222 as the updated vehicle sensing mechanism. The ego vehicle 220 changes to the selected updated vehicle sensing mechanism according to the driving characteristics of the subject vehicle 210, which allows the ego vehicle 220 to collects observations about the subject vehicle 210 using the radar system 221 while additionally tracking its movement using the rear camera system 222.

Thus, by dynamically adapting the vehicle sensing mechanisms that the ego vehicle 220 uses (e.g., radar system 221 and rear camera system 222) in real-time to be more optimal for the current scenario, the vehicle sensing mechanism selection system 225 can mitigate any interruptions in obtaining data about the subject vehicle 210 that may be experienced by being limited to using only the radar system 221 and improves the overall performance of the ego vehicle's unsafe driver detection features.

Figure 3:
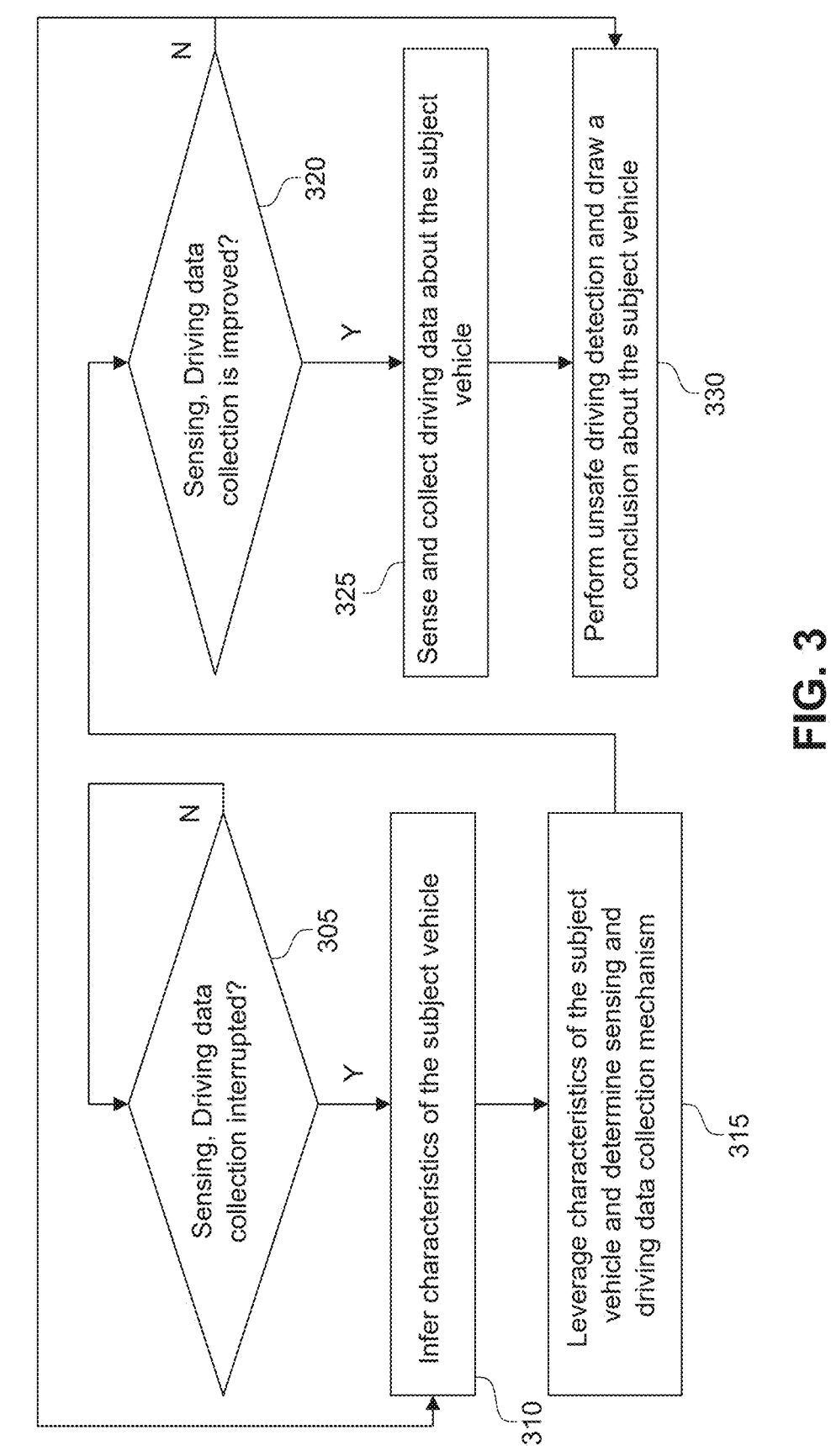
FIG. 3 is a flow diagram of an example method implementing the vehicle sensing mechanism selection process, in accordance with an embodiment of the technology disclosed herein.

FIG. 3 is a flow diagram of an example method, depicted as process 300, that is performed according to one embodiment of the systems and methods described herein. The process 300 is a method for implementing vehicle sensing mechanism selection techniques, as disclosed. The process 300 can be a series of executable operations in a machine-readable storage media performed by a hardware processor. A computing component can be a computer device used for implementing the disclosed mitigative action selection functions described herein. For example, the computing component may be the controller of a vehicle implementing the vehicle sensing mechanism selection system described above in reference to FIGS. 1A-1B. In another implementation, the computing component executing process 300 is a computer system that is external to the vehicle, such as an edge/cloud server, which can perform the training of an AI/ML agent remotely before it is subsequently deployed to the vehicle for use.

Process 300 can begin at operation 305, where a conditional check is performed to determine whether a vehicle sensing and/or driving data collection is interrupted. For example, a vehicle can employ one or more of its vehicle sensors to detect and/or monitor the movement of a proximately located subject vehicle in order to support computer-controlled operations for the vehicle, such as unsafe driver detection. Operation 305 can involve the vehicle determining that one or more of the vehicle's sensors no longer sense/detect the subject vehicle, determine whether there is a detected degradation in a quality of the sensed data generated by the initial vehicle sensing mechanism (e.g., quality of sensor data lower than a defined quality threshold), and/or determining that there has been an interruption in obtaining data or measurements related to how the subject vehicle is being maneuvered. For instance, during operation 305, the vehicle can determine that a loss in vehicular network connectivity (e.g., latency and packet loss of peer-to-peer network-based sensing) is causing data collection to be interrupted every second. In another example, operation 305 can involve the vehicle determining that a camera is no longer detecting the subject vehicle due to the subject vehicle abruptly changing lanes and being outside of the operational range of its camera system. In the case where there is no interruption detected in the vehicle sensing and/or driving data collection (shown as "No" in FIG. 3) the process 300 can return to operation 305 in an iterative manner until an interruption is detection. Alternatively, in the case where an interruption is detected in the vehicle sensing and/or driving data collection (shown as "Yes" in FIG. 3) the process 300 can proceed to operation 310.

Next, at operation 310, driving characteristics of the subject vehicle can be inferred. Driving characteristics of the subject vehicles that can be observed can include, but are not limited to, the following: movement pattern (e.g., periodic and non-periodic actions, shape of movement); recurrence of the movement pattern (e.g., how often the driver performs the movement); period of the pattern (e.g., time, day, road type); number of lanes driving characteristics of the subject vehicle traversed. In some embodiments, the vehicle performs operation 310, for instance utilized its vehicle sensors, to analyze data associated with observing the movement of the subject vehicle in order to determine its driving characteristics. In other embodiments, operation 310 can be performed by a groups of vehicles, or by a remote server. Additionally, in some cases, operation 310 involves implementing time series analysis to infer the driving characteristics of the subject vehicle. Furthermore, categories/patterns of driving characteristics can be used that define several identified characteristics of a subject vehicle as a larger scale maneuver and/or movement pattern, such as nudging; "S" shape swerving; "Zig-Zag" swerving; and the like. Also, operation 310 can include obtaining supplemental information that can provide more specific detail regarding the inferred driving characteristics of the subject vehicle, such as time, number of lanes, etc. For example, it can be determined in operation 310 that the subject vehicle has a movement pattern of nudging followed by unstable following distance that repeats every 5 seconds for a single lane. In some implementations, the ego vehicle receives support from a remote server regarding the inferred driving characteristics of the subject vehicle. For instance, the ego vehicle may generate a partial observation along with location, vehicle type which are transmitted to remote server. The remote server can then infer the characteristics (e.g., unsafe driving) of the subject vehicle.

Subsequently, at operation 315, the driving characteristics of the subject vehicle that were identified in previous operation 310 are leveraged in order to determine a vehicle sensing and/or driving data collection mechanism that is most optimal for the current driving conditions. In some embodiments, the vehicle is equipped with the functionality to decide which vehicle sensing mechanism and driving data collection strategy is optimal based on the driving characteristics of the subject vehicle. In an alternative embodiment, a remote server performs the data processing needed to make the determination in operation 315 on behalf of the vehicle, and then communicates data/instructions to the vehicle to ultimately to execute appropriate actions based on which vehicle sensing and/or driving data collection mechanism is selected.

Additionally, in some embodiments the relationship between observed driving characteristics of the subject vehicle and the particular vehicle sensing mechanism that is deemed most optimal is predetermined. For example, the vehicle can implement one or more predetermined rules, tables, data structures, and algorithms that are used to define a direct correspondence between parameters, which enables relationships between driving characteristics of the subject vehicle and one or more vehicle sensing mechanisms to be checked and determined in operation 315. The predetermined rules used in operation 315 can include other parameters that may be pertinent to vehicle movement in order to implement the defined relationships to one or more corresponding vehicle sensing mechanisms. Examples of parameters that can be for a defined correspondence to a vehicle sensing mechanism includes, but are not limited to: vehicle type (e.g., passenger car, SUV, truck); movement pattern (e.g., shape of movement); number of lanes impacted by the subject vehicle; degree of interruption (e.g., low, moderate, severe) of sensing and driving data collection, where sensing and driving data collection is interrupted every second (i.e., severe), camera performance degradation in sunlight, radar reflection on bridges, tunnels (i.e., low), and latency and packet loss of peer-to-peer network-based sensing and data collection (i.e., moderate); and the like.

In some embodiments, an AI/ML approach is utilized to train ML model(s) to learn which vehicle sensing mechanisms are most optimal based on the driving characteristics of a subject vehicle that have been learned over time. Thus, the trained AI/ML model(s) can be used in operation 315 to infer which vehicle sensing mechanism is optimal based on the driving characteristics for a subject vehicle that are observed in a current driving scenario. For example, an AI/ML model can be trained using historical data which shows that in multiple instances over time that using radar as the vehicle sensing mechanism has degraded performance under bridges due to iron reflection. Thus, the AI/ML model can predict that employing radar under similar current driving conditions, for instance driving along an expressway having multiple overpasses and bridges, may suffer from performance problem in such an environment. Consequently, in this example, the AI/ML model can infer that instead of utilizing radar in this environment where the vehicle may be subjected to radar interference that the camera system is to be selected as the optimal vehicle sensing mechanism.

According to the embodiments, operation 315 is performed dynamically in real-time while the vehicle is operating and may encounter other vehicles that are being driven unsafely. Consequently, operation 315 can ultimately select a vehicle sensing mechanism that is better adapted for the current environment and specific driving scenario, which may be different from the vehicle sensing mechanism that was being initially utilized by the vehicle to monitor the subject vehicle. In other words, the process 300 is implemented to intelligently apply the real-time data that is obtained regarding the current driving conditions and the driving characteristics of the subject vehicle that it is observing, in order to make a more context-rich and situationally aware selection of the vehicle sensing mechanism that is currently used. Thus, operation 315 can include controlling the current operation of the vehicle to dynamically switch to a different vehicle sensing mechanism. For example, in a scenario where the vehicle was previously using its radar system as the initial vehicle sensing mechanism to observe a subject vehicle, but operation 315 selects the combined use of the vehicle's radar system and rear camera system. Then, in this case, operation 315 can involve generating instructions in real-time for the vehicle to also turn on its rear camera system to start camera-based sensing of the subject vehicle. That is, in many cases operation 315 also involves updating the vehicle sensing mechanism that is being used at the vehicle and/or jointly running multiple vehicle sensing mechanisms that have been deemed most optimal.

Then, at operation 320, a conditional check is performed to determine whether the operation of the vehicle sensing mechanism and/or the process of data collection have been improved. That is, the process 300 can assess whether the selection made in previous operation 315 translates to improving how the subject vehicle is currently being monitored. As an example, if operation 320 determines that there are still substantial interruptions in data collection while monitoring the subject vehicle, for instance multiple time periods where a rear camera system fails to detect any vehicles within its range, then it can be deemed that the vehicle sensing and/or data collection process has not been improved. In this case, when operation 320 determines that the vehicle sensing mechanisms and/or data collection process has not cause improvement in observing the subject vehicle (shown in FIG. 3 as "No") then the process 300 can return to operation 310 in order to re-analyze the driving characteristics of the subject vehicle and perform a new/updated selection for the optimal vehicle sensing mechanism.

Next, at operation 325, the vehicle sensing mechanism and data collecting strategy that was selected in previous step 320 can be actively employed to monitor the subject vehicle. For example, in a case where jointly using the vehicle's rear camera system and the radar system are determined to be most optimal in the previous operation 320, then operation 325 involves that vehicle switching to using both its rear camera system and the radar system in order to currently monitor the subject vehicle.

The process 300 proceeds to operation 330 where the unsafe driving detection functions are performed. After process 300 applies dynamic changes to the sensing mechanism utilized to better suit the current driving scenario, the adjustment enables data to be collected on a subject vehicle where data loss and interruptions have been substantively mitigated. Consequently, the process 300 improves the overall performance of operation 330, which executes unsafe driver detection analysis and other features by dynamically changing and/or updating the sensing mechanism that the vehicle applies to a scenario in real-time. According to the embodiments, operation 330 can involve analysis and a resulting determination of whether a subject vehicle is exhibiting unsafe driving behavior. Further, operation 330 can involve the vehicle performing autonomous and/or semi-autonomous functions in response to determining that a vehicle is deemed unsafe, including actions that can avoid accidents/collisions with the vehicle being driven unsafely such as automatic avoidance maneuvers, lane change, acceleration/deceleration, and the like. Thus, process 300 implements vehicle sensing mechanism selection functions in a manner that improves the overall performance of unsafe river detection technologies, and thereby enhances road safety, reduces accidents, and contributes to improvement of driving behavior.

Figure 4:
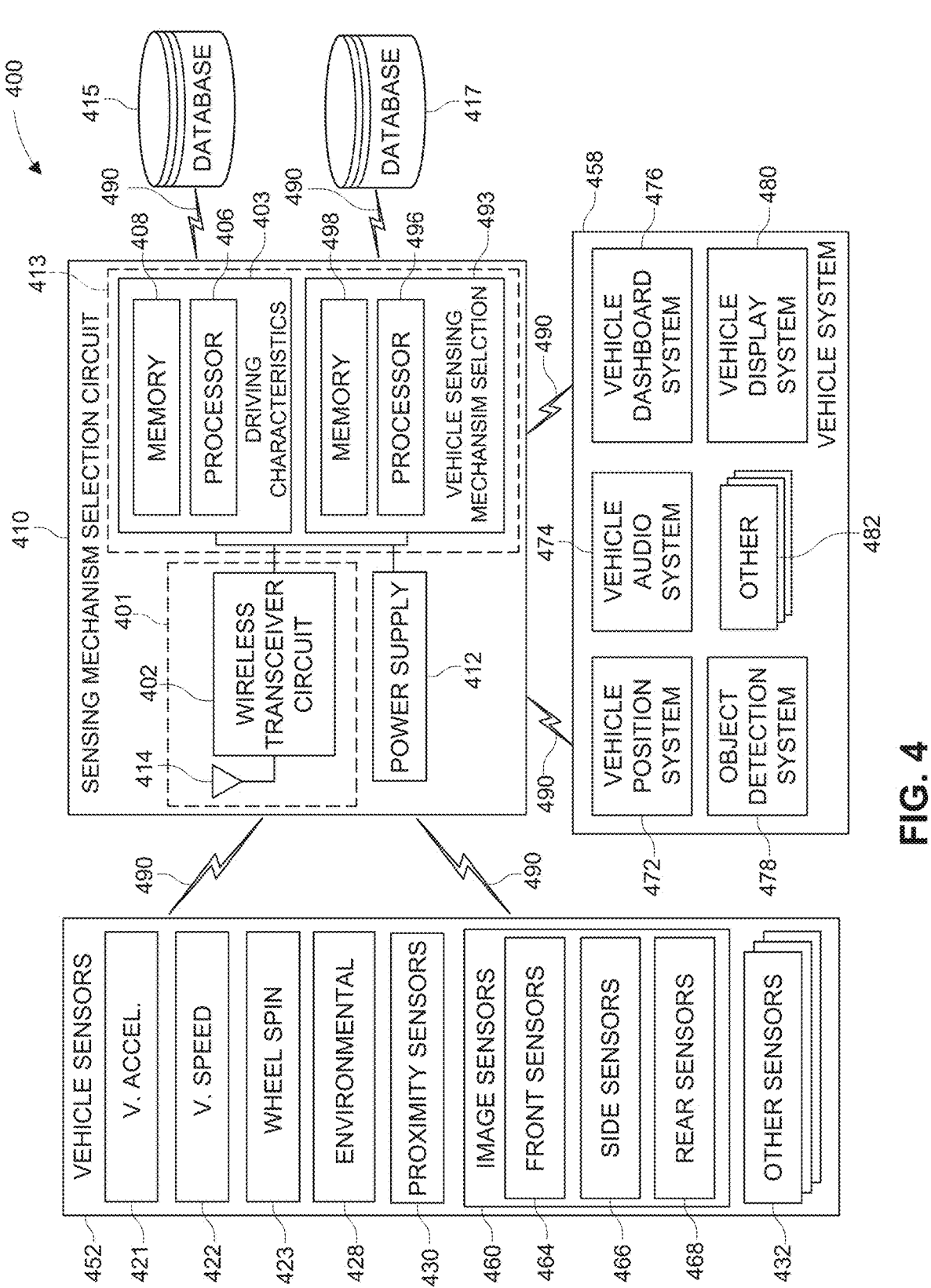
FIG. 4 depicts an example network architecture of an in-vehicle vehicle sensing mechanism selection system, in accordance with an embodiment of the technology disclosed herein.

FIG. 4 illustrates an example of a vehicle sensing mechanism selection system in a vehicle 400 in accordance with one embodiment of the systems and methods described herein. The vehicle sensing mechanism selection system includes a vehicle sensing mechanism selection circuit 410 communicatively connected to a plurality of sensors 452, a plurality of vehicle systems 458, a database 415 comprising roadway data, and a database 417 comprising vehicle sensing mechanism selection rules. Sensors 452 and vehicle systems 458 wirelessly communicate with the vehicle sensing mechanism selection circuit 410. Although in this example sensors 452 and vehicle systems 458 are depicted as communicating with vehicle sensing mechanism selection circuit 410, they can also communicate with each other as well as with other vehicle systems. The vehicle sensing mechanism selection circuit 410 can be implemented as an ECU or as part of an ECU. In other embodiments, the vehicle sensing mechanism selection circuit 410 can be implemented independently of the ECU.

The vehicle sensing mechanism selection circuit 410 in this example includes a communication circuit 401, a controller/CPU 413 comprising a driving characteristics engine 403, and a vehicle sensing mechanism selection engine 493, and a power suppl 412. Each engine includes a respective processor 406, 496 and respective memory 408, 498. For example, the driving characteristics engine 403 includes a processor 406, and a memory 408 configured for performing the techniques involved in determining the driving characteristics of a subject vehicle (e.g., identifying whether a subject vehicle is swerving, nudging, etc.) described herein, and the vehicle sensing mechanism selection engine 493 includes a processor 496 and a memory 498 configured for performing the optimal vehicle sensing mechanism and/or data collection strategy selection techniques described herein.

Processor 406 can include one or more GPUs, CPUs, microprocessors, or any other suitable processing system. Processor 406 may include a single core or multicore processors. The memory 408 may include one or more various forms of memory or data storage (e.g., flash, RAM, etc.) that may be used to store instructions and variables for processor 406 as well as any other suitable information, such as, one or more of the following elements: rules data; resource data; GPS data; and base data, as described below. Memory 408 can be made up of one or more modules of one or more different types of memory, and may be configured to store data and other information as well as operational instructions that may be used by the processors 406 and 496.

Although the example of FIG. 4 is illustrated using processor and memory circuitry, as described below with reference to circuits disclosed herein, controller/CPU 413 can be implemented utilizing any form of circuitry including, for example, hardware, software, or a combination thereof. By way of further example, one or more processors, controllers, ASICs, PLAS, PALs, CPLDs, FPGAs, logical components, software routines or other mechanisms might be implemented to make up the vehicle sensing mechanism selection circuit 410. Communication circuit 401 includes either or both a wireless transceiver circuit 402 with an associated antenna 414 and a wired I/O interface with an associated hardwired data port (not illustrated). Communication circuit 401 can provide for V2X communications capabilities, allowing the vehicle sensing mechanism selection circuit 410 to communicate with edge devices, such as roadside equipment (RSE), network cloud servers and cloud-based databases, and/or other vehicles.

As this example illustrates, communications with the vehicle sensing mechanism selection circuit 410 can include either or both wired and wireless communications circuits 401. Wireless transceiver circuit 402 can include a transmitter and a receiver (not shown) to allow wireless communications via any of a number of communication protocols such as, for example, Wi-Fi, Bluetooth, near field communications (NFC), Zigbee, and any of a number of other wireless communication protocols whether standardized, proprietary, open, point-to-point, networked or otherwise. Antenna 414 is coupled to wireless transceiver circuit 402 and is used by wireless transceiver circuit 402 to transmit radio signals wirelessly to wireless equipment with which it is connected and to receive radio signals as well. These RF signals can include information of almost any sort that is sent or received by the vehicle sensing mechanism selection circuit 410 to/from other entities such as sensors 452 and vehicle systems 458.

Power supply 412 can include one or more of a battery or batteries (such as, e.g., Li-ion, Li-Polymer, NiMH, NiCd, NiZn, and NiH2, to name a few, whether rechargeable or primary batteries,), a power connector (e.g., to connect to vehicle supplied power, etc.), an energy harvester (e.g., solar cells, piezoelectric system, etc.), or it can include any other suitable power supply.

In the illustrated example, sensors 452 include vehicle acceleration sensors 421, vehicle speed sensors 422, wheel-spin sensors 423 (e.g., one for each wheel), environmental sensors 428 (e.g., to detect salinity or other environmental conditions), proximity sensor 430 (e.g., sonar, radar, lidar or other vehicle proximity sensors), and image sensors 460. Additional sensors (i.e., other sensors 432) can be included as may be appropriate for a given implementation of the vehicle sensing mechanism selection circuit 410.

The sensors 452 include front facing image sensors 464, side facing image sensors 466, and/or rear facing image sensors 468. Image sensors may capture information which may be used in detecting not only vehicle conditions but also detecting conditions external to the ego vehicle 120 (shown in FIG. 1A) as well. Image sensors that might be used to detect external conditions can include, for example, cameras or other image sensors configured to capture data in the form of sequential image frames forming a video in the visible spectrum, near infra-red (IR) spectrum, IR spectrum, ultra-violet spectrum, etc. Image sensors 460 can be used to, for example, to detect objects in an environment surrounding ego vehicle 120, for example, traffic signs indicating a current speed limit, road curvature, obstacles, surrounding vehicles, and so on. For example, one or more image sensors 460 may capture images of neighboring vehicles in the surrounding environment. As another example, object detecting and recognition techniques may be used to detect objects and environmental conditions, such as, but not limited to, road conditions, surrounding vehicle behavior (e.g., driving behavior and the like), parking availability, etc. Additionally, sensors may estimate proximity between vehicles. For instance, the image sensors 460 may include cameras that may be used with and/or integrated with other proximity sensors 432 such as LIDAR sensors or any other sensors capable of capturing a distance. As used herein, a sensor set of a vehicle may refer to sensors 452 and image sensors 460 as a set.

Vehicle systems 458 include any of a number of different vehicle components or subsystems used to control or monitor various aspects of the vehicle and its performance. In this example, the vehicle systems 458 includes a vehicle positioning system 472; vehicle audio system 474 comprising one or more speakers configured to deliver audio throughout the vehicle; object detection system 478 to perform image processing such as object recognition and detection on images from image sensors 460, proximity estimation, for example, from image sensors 460 and/or proximity sensors, etc. for use in other vehicle systems; suspension system 480 such as, for example, an adjustable-height air suspension system, or an adjustable-damping suspension system; and other vehicle systems 482 (e.g., (e.g., Advanced Driver-Assistance Systems (ADAS), such as forward/rear collision detection and warning systems, pedestrian detection systems, autonomous or semi-autonomous driving systems, and the like).

The vehicle positioning system 472 includes a global positioning system (GPS). Ego vehicle 120 and the one or more connected vehicles may be DSRC-equipped vehicles. A DSRC-equipped vehicle is a vehicle which: (1) includes a DSRC radio; (2) includes a DSRC-compliant Global Positioning System (GPS) unit; and (3) is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages.

A DSRC-compliant GPS unit is operable to provide positional information for a vehicle (or some other DSRC-equipped device that includes the DSRC-compliant GPS unit) that has lane-level accuracy. In some embodiments, a DSRC-compliant GPS unit is operable to identify, monitor and track its two-dimensional position within 1.5 meters of its actual position 68% of the time under an open sky.

Conventional GPS communication includes a GPS satellite in communication with a vehicle comprising a GPS tracking device. The GPS tracking device emits/receives a signal to/from the GPS satellite. For example, a GPS tracking device is installed into a vehicle. The GPS tracking device receives position data from the GPS tracking device. The position data gathered from the vehicle is stored in the tracking device. The position data is transmitted to the cloud server via a wireless network.

A conventional GPS provides positional information that describes a position of a vehicle with an accuracy of plus or minus 10 meters of the actual position of the conventional GPS unit. By comparison, a DSRC-compliant GPS unit provides GPS data that describes a position of the DSRC-compliant GPS unit with an accuracy of plus or minus 1.5 meters of the actual position of the DSRC-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in on a roadway. Some safety or autonomous driving applications provided by an Advanced Driver Assistance System (ADAS) of a modern vehicle require positioning information that describes the location of the vehicle with lane-level accuracy. In addition, the current standard for DSRC requires that the location of the vehicle be described with lane-level accuracy.

As used herein, the words "geographic location," "location," "geographic position" and "position" refer to a latitude and longitude of an object (or, a latitude, longitude, and elevation of an object), such as a connected vehicle, an RSE, a client device, etc. As used herein, the words "geographic area", and "area," refer to a physical space surrounding a location (e.g., an area of defined space surrounding a geographic location or geographic position). The example embodiments described herein may provide positioning information that describes a geographic position of a vehicle with an accuracy of one or more of: (1) at least plus or minus 1.5 meters in relation to the actual geographic position of the vehicle in two dimensions including a latitude and a longitude; and (2) at least plus or minus 3 meters in relation to the actual geographic position of the vehicle in an elevation dimension. Accordingly, the example embodiments described herein are able to describe the geographic position of the vehicle with lane-level accuracy or better.

Network 490 may be a conventional type of network, wired or wireless, and may have numerous different configurations including a star configuration, token ring configuration, or other configurations. Furthermore, the network 490 may include a local area network (LAN), a wide area network (WAN) (e.g., the Internet), or other interconnected data paths across which multiple devices and/or entities may communicate. In some embodiments, the network may include a peer-to-peer network. The network may also be coupled to or may include portions of a telecommunications network for sending data in a variety of different communication protocols. In some embodiments, the network 490 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, Wi-Fi (infrastructure mode), Wi-Fi (ad-hoc mode), visible light communication, TV white space communication and satellite communication. The network may also include a mobile data network that may include 3G, 4G, 5G, LTE, LTE-V2V, LTE-V2I, LTE-V2X, LTE-D2D, VOLTE, 5G-V2X or any other mobile data network or combination of mobile data networks. Further, the network 490 may include one or more IEEE 802.11 wireless networks.

In one embodiment, data comprising the location of vehicle is captured by the vehicle position system 472. The vehicle position system 472 can include one or more sensors 452 configured to capture vehicle position data. The vehicle positioning system 472 communicates with the vehicle sensing mechanism selection circuit 410 to communicate and utilize actions at the ego vehicle 120 for various driving and/or maneuvering functions, including autonomous or semi-autonomous vehicle/driver safety features.

In an embodiment, the vehicle sensing mechanism system produces notifications for the driver of the ego vehicle 120 using one or more notification methods. For example, the driver may receive a visual and/or audible notification that the vehicle may need to perform a maneuver to avoid an approaching unsafe driver, traffic incident, and/or traffic congestion, based on data that the vehicle sensing mechanism selection circuit 410 has analyzed accordance with the capabilities, as disclosed herein. In one embodiment, the notification methods include the vehicle systems 458 comprising the vehicle audio system 472 and the vehicle dashboard system 476. The notification methods includes visual and/or audible methods of informing the driver of safety related issues. In one embodiment, the notification methods include notifying the driver of the ego vehicle 120 via one or more vehicle systems 458. For example, in one embodiment, the driver is notified of an unsafe driver via the vehicle audio system 474 (e.g., instructions played/broadcasted over one or more vehicle speakers), the vehicle display system 480 and/or the vehicle dashboard system 476. In one embodiment, the driver is notified of safety issues by a navigation system within the instrument cluster and the dashboard GUI. The notification can include visual instructions (e.g., visual directions on how to proceed), and/or auditory instructions (e.g., verbal commands from the vehicle sensing mechanism selection system to the driver).

Figure 5:
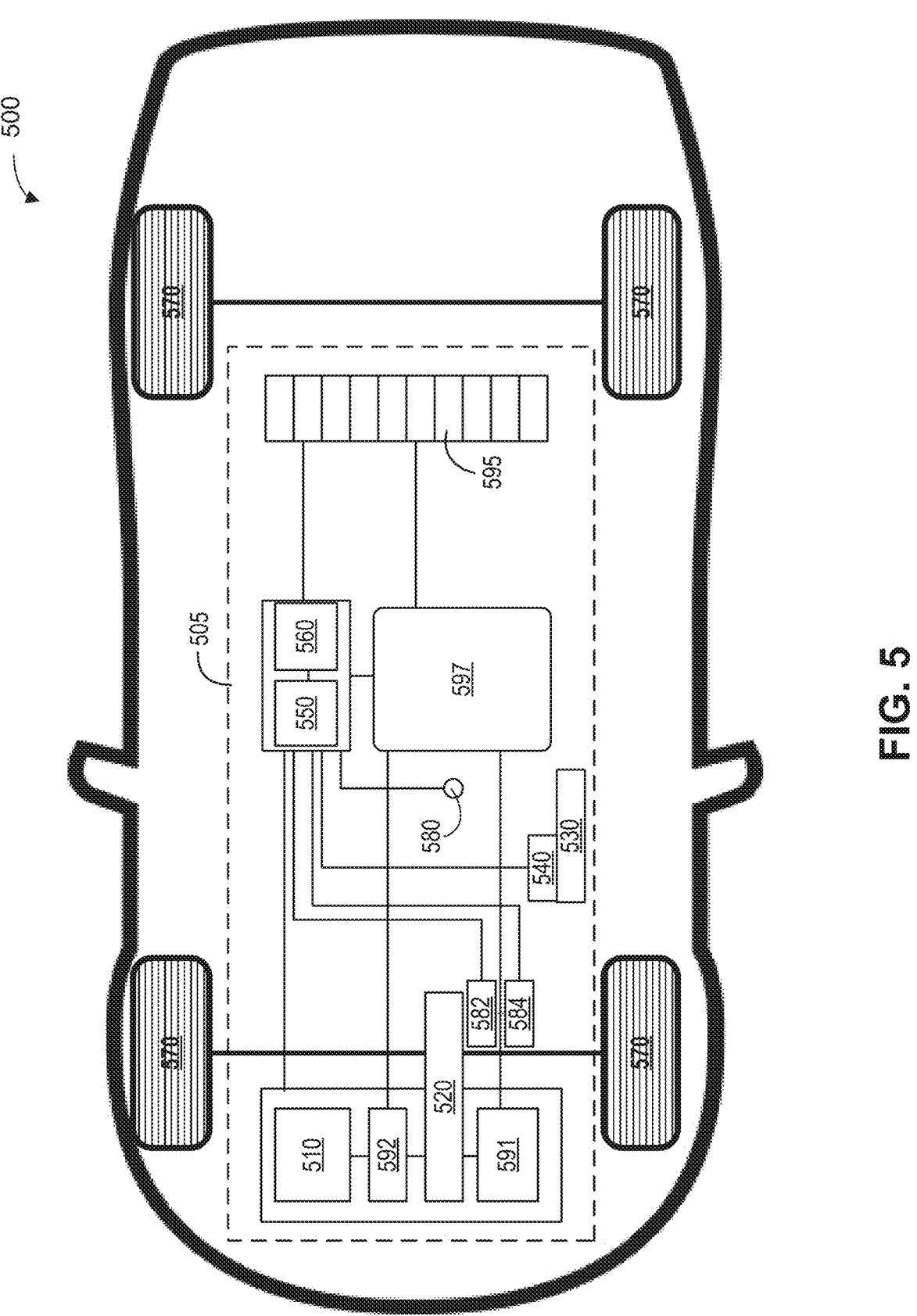
FIG. 5 is a schematic representation of an example vehicle with which embodiments of the vehicle sensing mechanism selection system disclosed herein may be implemented.

FIG. 5 illustrates an example hybrid electric vehicle (HEV) 500 in which various embodiments for the vehicle sensing mechanism selection system are implemented. For example, in one embodiment, the ego vehicle 120 (shown in FIG. 1A) is a HEV 500. It should be understood that various embodiments disclosed herein may be applicable to/used in various vehicles (internal combustion engine (ICE) vehicles, fully electric vehicles (EVs), etc.) that are fully or partially autonomously controlled/operated, and not solely HEVs.

Here, HEV 500 includes drive force unit 505 and wheels 570. Drive force unit 505 includes an engine 510, motor generators (MGs) 591 and 592, a battery 595, an inverter 597, a brake pedal 530, a brake pedal sensor 540, a transmission 520, a memory 560, an electronic control unit (ECU) 550, a shifter 580, a speed sensor 582, and an accelerometer 584.

Engine 510 primarily drives the wheels 570. Engine 510 can be an ICE that combusts fuel, such as gasoline, ethanol, diesel, biofuel, or other types of fuels which are suitable for combustion. The torque output by engine 1410 is received by the transmission 520. MGs 591 and 592 can also output torque to the transmission 520. Engine 510 and MGs 591 and 592 may be coupled through a planetary gear (not shown in FIG. 4). The transmission 520 delivers an applied torque to the wheels 570. The torque output by engine 510 does not directly translate into the applied torque to the wheels 570.

MGs 591 and 592 can serve as motors which output torque in a drive mode, and can serve as generators to recharge the battery 595 in a regeneration mode. The electric power delivered from or to MGs 591 and 592 passes through inverter 597 to battery 595. Brake pedal sensor 540 can detect pressure applied to brake pedal 530, which may further affect the applied torque to wheels 570. Speed sensor 582 is connected to an output shaft of transmission 520 to detect a speed input which is converted into a vehicle speed by ECU 1450. Accelerometer 584 is connected to the body of HEV 500 to detect the actual deceleration of HEV 500, which corresponds to a deceleration torque.

Transmission 520 is a transmission suitable for an HEV. For example, transmission 520 can be an electronically controlled continuously variable transmission (ECVT), which is coupled to engine 510 as well as to MGs 591 and 592. Transmission 520 can deliver torque output from a combination of engine 510 and MGs 591 and 592. The ECU 550 controls the transmission 520, utilizing data stored in memory 560 to determine the applied torque delivered to the wheels 570. For example, ECU 550 may determine that at a certain vehicle speed, engine 510 should provide a fraction of the applied torque to the wheels while MG 591 provides most of the applied torque. ECU 550 and transmission 540 can control an engine speed (NE) of engine 540 independently of the vehicle speed (V).

ECU 540 may include circuitry to control the above aspects of vehicle operation. ECU 540 may include, for example, a microcomputer that includes a one or more processing units (e.g., microprocessors), memory storage (e.g., RAM, ROM, etc.), and I/O devices. ECU 540 may execute instructions stored in memory to control one or more electrical systems or subsystems in the vehicle. ECU 540 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., anti-lock braking system (ABS) or electronic stability control (ESC)), battery management systems, and so on. These various control units can be implemented using two or more separate electronic control units, or using a single electronic control unit.

MGs 591 and 592 each may be a permanent magnet type synchronous motor including for example, a rotor with a permanent magnet embedded therein. MGs 591 and 592 may each be driven by an inverter controlled by a control signal from ECU 540 so as to convert direct current (DC) power from battery 545 to alternating current (AC) power, and supply the AC power to MGs 591, 592. MG 542 may be driven by electric power generated by motor generator MG 591. It should be understood that in embodiments where MG 591 and MG 592 are DC motors, no inverter is required. The inverter, in conjunction with a converter assembly may also accept power from one or more of MGs 591, 592 (e.g., during engine charging), convert this power from AC back to DC, and use this power to charge battery 595 (hence the name, motor generator). ECU 550 may control the inverter, adjust driving current supplied to MG 592, and adjust the current received from MG 591 during regenerative coasting and braking.

Battery 595 may be implemented as one or more batteries or other power storage devices including, for example, lead-acid batteries, lithium ion, and nickel batteries, capacitive storage devices, and so on. Battery 595 may also be charged by one or more of MGs 591, 592, such as, for example, by regenerative braking or by coasting during which one or more of MGs 591, 592 operates as generator. Alternatively (or additionally, battery 595 can be charged by MG 591, for example, when HEV 1400 is in idle (not moving/not in drive). Further still, battery 595 may be charged by a battery charger (not shown) that receives energy from engine 510. The battery charger may be switched or otherwise controlled to engage/disengage it with battery 595. For example, an alternator or generator may be coupled directly or indirectly to a drive shaft of engine 510 to generate an electrical current as a result of the operation of engine 510. Still other embodiments contemplate the use of one or more additional motor generators to power the rear wheels of a vehicle (e.g., in vehicles equipped with 4-Wheel Drive), or using two rear motor generators, each powering a rear wheel.

Figure 6:
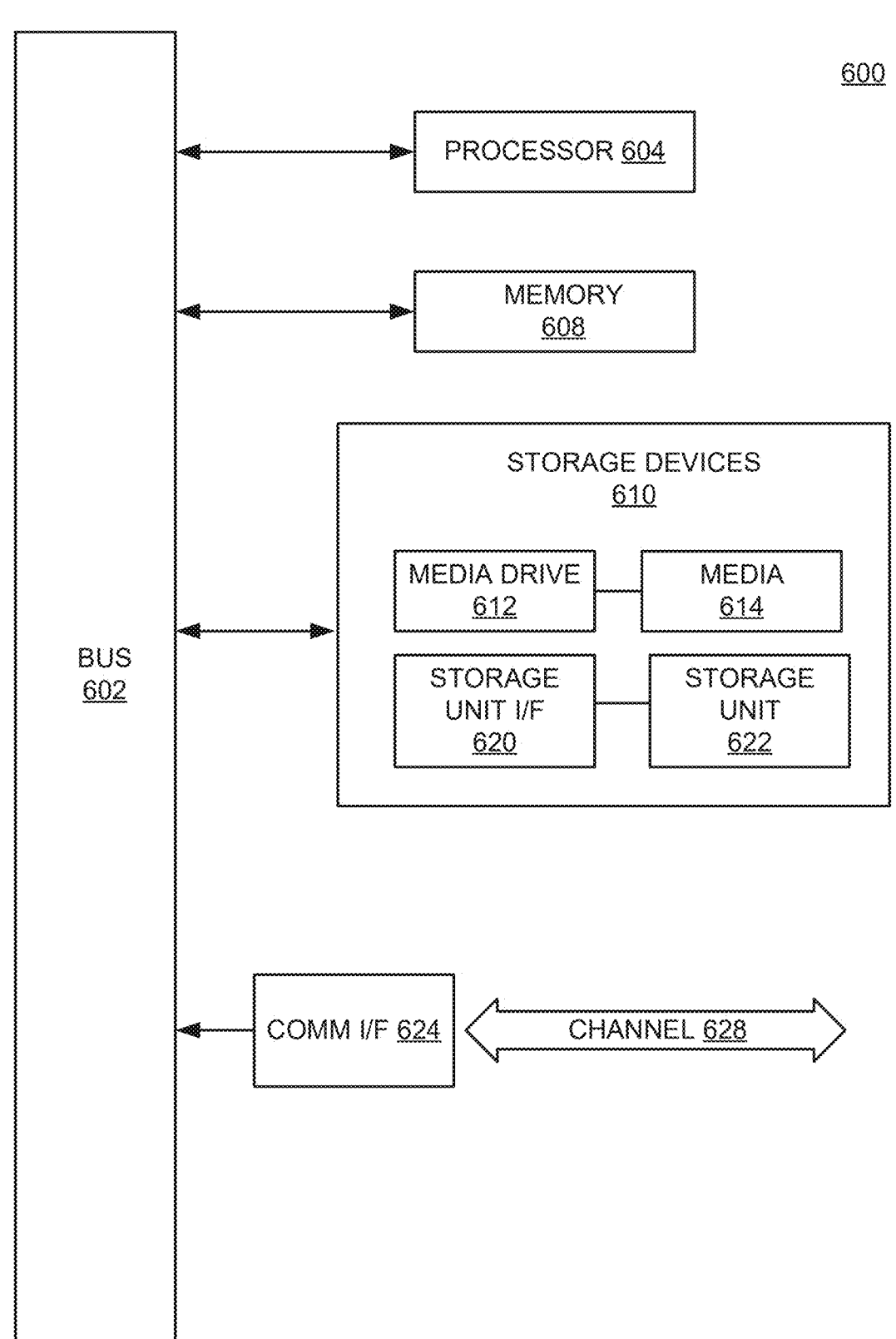
FIG. 6 is an example computing component that may be used to implement various features of embodiments described in the present disclosure.

Battery 595 may also be used to power other electrical or electronic systems in the vehicle. Battery 595 can include, for example, one or more batteries, capacitive storage units, or other storage reservoirs suitable for storing electrical energy that can be used to power MG 591 and/or MG 592. When battery 595 is implemented using one or more batteries, the batteries can include, for example, nickel metal hydride batteries, lithium ion batteries, lead acid batteries, nickel cadmium batteries, lithium ion polymer batteries, and other types of batteries.

Where components are implemented in whole or in part using software, these software elements can be implemented to operate with a computing or processing component capable of carrying out the functionality described with respect thereto. One such example computing component is shown in FIG. 6. Various embodiments are described in terms of this example-computing component 600. After reading this description, it will become apparent to a person skilled in the relevant art how to implement the application using other computing components or architectures.

Referring now to FIG. 6, computing component 600 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 600 might also represent computing capabilities embedded within or otherwise available to a given device. For example, a computing component might be found in other electronic devices such as, for example, portable computing devices, and other electronic devices that might include some form of processing capability.

Computing component 600 might include, for example, one or more processors, controllers, control components, or other processing devices. This can include a processor 604. Processor 604 might be implemented using a general-purpose or special-purpose processing engine such as, for example, a microprocessor, controller, or other control logic. Processor 604 may be connected to a bus 602. However, any communication medium can be used to facilitate interaction with other components of computing component 600 or to communicate externally.

Computing component 600 might also include one or more memory components, simply referred to herein as main memory 608. For example, random access memory (RAM) or other dynamic memory, might be used for storing information and instructions to be executed by processor 604. Main memory 608 might also be used for storing temporary variables or other intermediate information during execution of instructions to be executed by processor 604. Computing component 600 might likewise include a read only memory ("ROM") or other static storage device coupled to bus 602 for storing static information and instructions for processor 604.

The computing component 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a solid-state drive, a magnetic tape drive, an optical drive, a compact disc (CD) or digital video disc (DVD) drive (R or RW), or other removable or fixed media drive might be provided. Storage media 614 might include, for example, a hard disk, an integrated circuit assembly, magnetic tape, cartridge, optical disk, a CD or DVD. Storage media 614 may be any other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing component 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory component) and memory slot. Other examples may include a PCMCIA slot and card, and other fixed or removable storage units 622 and interfaces 620 that allow software and data to be transferred from storage unit 622 to computing component 600.

Computing component 600 might also include a communications interface 624. Communications interface 624 might be used to allow software and data to be transferred between computing component 600 and external devices. Examples of communications interface 624 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 624 may be carried on signals, which can be electronic, electromagnetic (which includes optical) or other signals capable of being exchanged by a given communications interface 624. These signals might be provided to communications interface 624 via a channel 628. Channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 608, storage unit 620, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 600 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system, comprising:
   a processor device configured to:
      analyze, from an initial vehicle sensing mechanism of an ego vehicle, data associated with driving characteristics of a subject vehicle to infer a category of driving characteristics;
      detect an interruption in obtaining the data associated with the driving characteristics from the initial vehicle sensing mechanisms; and
      in response to detecting the interruption, select for the ego vehicle one or more vehicle sensing mechanisms determined for observing the subject vehicle based on the inferred category, and generate instructions to control the selected one or more vehicle sensing mechanisms to obtain data associated with movement of the subject vehicle; and
   a controller device configured to detect that the subject vehicle is exhibiting unsafe driver behavior based on data associated with the movement of the subject vehicle obtained using the selected one or more vehicle sensing mechanisms and, in response, to execute autonomous actions to maneuver the ego vehicle.

2. The system of claim 1, wherein the processor device is further configured to select the one or more vehicle sensing mechanisms by determining a defined relationship between the driving characteristics of the subject vehicle and the one or more vehicle sensing mechanisms that are deemed suitable for observing the subject vehicle.

3. The system of claim 2, wherein the processor device is further configured to employ an initial vehicle sensing mechanism to obtain data associated with driving characteristics of a subject vehicle.

4. The system of claim 3, wherein the processor device is further configured to update from the initial vehicle sensing mechanism to the selected one or more vehicle sensing mechanisms to obtain the data associated with the movement of the subject vehicle for unsafe driving detection.

5. The system of claim 4, wherein the processor device is further configured to generate instructions in real-time to control the one or more vehicle sensing mechanisms to start obtaining the data associated with the movement of the subject vehicle for unsafe driving detection.

6. The system of claim 5, wherein the one or more vehicle sensing mechanisms comprise: a peer-to-peer network, a rear camera system, a radar system, and a combination thereof.

7. The system of claim 6, wherein the system comprises a wireless communication device connected to a plurality of communicatively connected vehicles to form the peer-to-peer network.

8. The system of claim 2, wherein the processor device is further configured to select the one or more vehicle sensing mechanisms by applying a trained Artificial Intelligence (AI)/Machine Learning (ML) model.

9. The system of claim 1, wherein the processor device is further configured to identify one or more defined categories of driving characteristics for the subject vehicle based on analyzing data associated with driving characteristics of the subject vehicle.

10. The system of claim 9, wherein the one or more defined categories of driving characteristics for the subject vehicle comprise: nudging, "S" shape swerving, and "Zig-Zag" swerving.

11. A non-transitory computer readable medium comprising instructions, that when read by a processor, cause the processor to:

analyze, from an initial vehicle sensing mechanisms of an ego vehicle, data associated with driving characteristics of a subject vehicle to infer a category of driving characteristics;

detect an interruption in obtaining the data associated with the driving characteristics from the initial vehicle sensing mechanism;

select for the ego vehicle, in response to detecting the interruption, one or more vehicle sensing mechanisms determined for observing the subject vehicle based on the inferred category, and generate instructions to control the selected one or more vehicle sensing mechanisms to obtain data associated with movement of the subject vehicle,; and execute autonomous actions to maneuver the ego vehicle in response to detecting that the subject vehicle is exhibiting unsafe driver behavior, wherein detecting that the subject vehicle is exhibiting unsafe driver behavior is based on data associated with the movement of the subject vehicle obtained using the selected one or more vehicle sensing mechanisms.

12. The non-transitory computer readable medium of claim 11, wherein the instructions, when read by a processor, further cause the processor to select the one or more vehicle sensing mechanisms by determining a defined relationship between the driving characteristics of the subject vehicle and the one or more vehicle sensing mechanisms deemed suitable for observing the subject vehicle.

13. The non-transitory computer readable medium of claim 12, wherein the instructions, when read by a processor, further cause the processor to update from an initial vehicle sensing mechanism previously employed by the ego vehicle to the selected one or more vehicle sensing mechanisms to obtain the data associated with the movement of the subject vehicle for unsafe driving detection.

14. The non-transitory computer readable medium of claim 13, wherein the instructions, when read by a processor, further cause the processor to generate instructions in real-time to control the one or more vehicle sensing mechanisms to start obtaining the data associated with the movement of the subject vehicle for unsafe driving detection.

15. The non-transitory computer readable medium of claim 12, wherein the one or more vehicle sensing mechanisms comprise: a peer-to-peer network, a rear camera system, a radar system, and a combination thereof.

16. A method, comprising:

sensing, via an initial vehicle sensing mechanism of an ego vehicle, whether there is an interruption in obtaining data associated with driving characteristics of a subject vehicle;

in response to sensing the interruption, analyzing, by a processor on the ego vehicle, sensor data obtained by the initial vehicle sensing mechanisms to infer driving characteristics of the subject vehicle;

selecting, by the processor and based on the inferred driving characteristics, one or more vehicle sensing mechanisms determined for observing the subject vehicle;

updating, by the ego vehicle, from the initial vehicle sensing mechanism to the selected one or more vehicle sensing mechanisms and generating instructions to control the selected one or more vehicle sensing mechanisms to obtain data associated with movement of the subject vehicle; and detecting whether the subject vehicle is exhibiting unsafe driver behavior based on data associated with movement of the subject vehicle obtained using the selected one or more vehicle sensing mechanisms and, in response to detecting the unsafe driver behavior, causing a controller to execute autonomous actions to maneuver the ego vehicle.

17. The method of claim 16, further comprising determining whether there are additional interruptions in obtaining data associated with driving characteristics of the subject vehicle subject using the selected one or more vehicle sensing mechanisms; and in response to detecting no additional interruptions in obtaining data associated with movement of the subject vehicle, employing the one or more selected vehicle sensing mechanisms to obtain data associated with movement of the subject vehicle for detecting whether the subject vehicle is exhibiting unsafe driver behavior.

18. The method of claim 17, wherein detecting that the subject vehicle is exhibiting unsafe driver behavior is based on data associated with the movement of the subject vehicle obtained using the selected one or more vehicle sensing mechanisms.

19. The method of claim 16, wherein sensing whether there is an interruption in obtaining data associated comprises determining that the initial vehicle sensing mechanism of the ego vehicle fails to sense the subject vehicle.

20. The method of claim 16, wherein sensing whether there is an interruption in obtaining data comprises determining a loss in vehicular network connectivity for a period of time.

* * * * *